(12) United States Patent
Chien

(10) Patent No.: US 12,442,514 B2
(45) Date of Patent: Oct. 14, 2025

(54) CONTROL DEVICE FOR ILLUMINATION DEVICE, AND ILLUMINATION SYSTEM

(71) Applicant: Japan Display Inc., Tokyo (JP)

(72) Inventor: Chiehan Chien, Tokyo (JP)

(73) Assignee: Japan Display Inc., Tokyo (JP)

( * ) Notice: Subject to any disclaimer, the term of this patent is extended or adjusted under 35 U.S.C. 154(b) by 0 days.

(21) Appl. No.: 18/983,810

(22) Filed: Dec. 17, 2024

(65) Prior Publication Data

US 2025/0129915 A1 Apr. 24, 2025

Related U.S. Application Data

(63) Continuation of application No. PCT/JP2023/023345, filed on Jun. 23, 2023.

(30) Foreign Application Priority Data

Jun. 24, 2022 (JP) ................................ 2022-102163

(51) Int. Cl.
*F21V 14/00* (2018.01)

(52) U.S. Cl.
CPC .................................. *F21V 14/003* (2013.01)

(58) Field of Classification Search
CPC .................................................... F21V 14/003
See application file for complete search history.

(56) References Cited

FOREIGN PATENT DOCUMENTS

| JP | H02-065001 A | 3/1990 |
|---|---|---|
| JP | H05-2908 A | 1/1993 |
| JP | H06-310284 A | 11/1994 |
| JP | 2010-014740 A | 1/2010 |
| JP | 2014-085902 A | 5/2014 |
| JP | 2014-093147 A | 5/2014 |
| JP | 2019-028320 A | 2/2019 |
| JP | 2019-080176 A | 5/2019 |
| JP | 2019-129443 A | 8/2019 |
| JP | 2022-032273 A | 2/2022 |

OTHER PUBLICATIONS

Search Report issued in International Patent Application No. PCT/JP2023/023345, mailed on Sep. 12, 2023 and English translation of same. 7 pages.

*Primary Examiner* — Sean P Gramling
(74) *Attorney, Agent, or Firm* — K&L Gates LLP

(57) ABSTRACT

According to an aspect, a control device for an illumination device includes: a touch sensor and a display panel. A light diffusion degree setting screen for executing light diffusion degree setting processing for the illumination device is displayed on a display region of the display panel. The light diffusion degree setting screen is provided with a light distribution shape object with a central point at the origin of an XY plane, a first light diffusion degree setting object with a central point at an intersection point of an X axis of the XY plane and an outline of the light distribution shape object, and a second light diffusion degree setting object with a central point at an intersection point of a Y axis of the XY plane and the outline of the light distribution shape object.

22 Claims, 30 Drawing Sheets

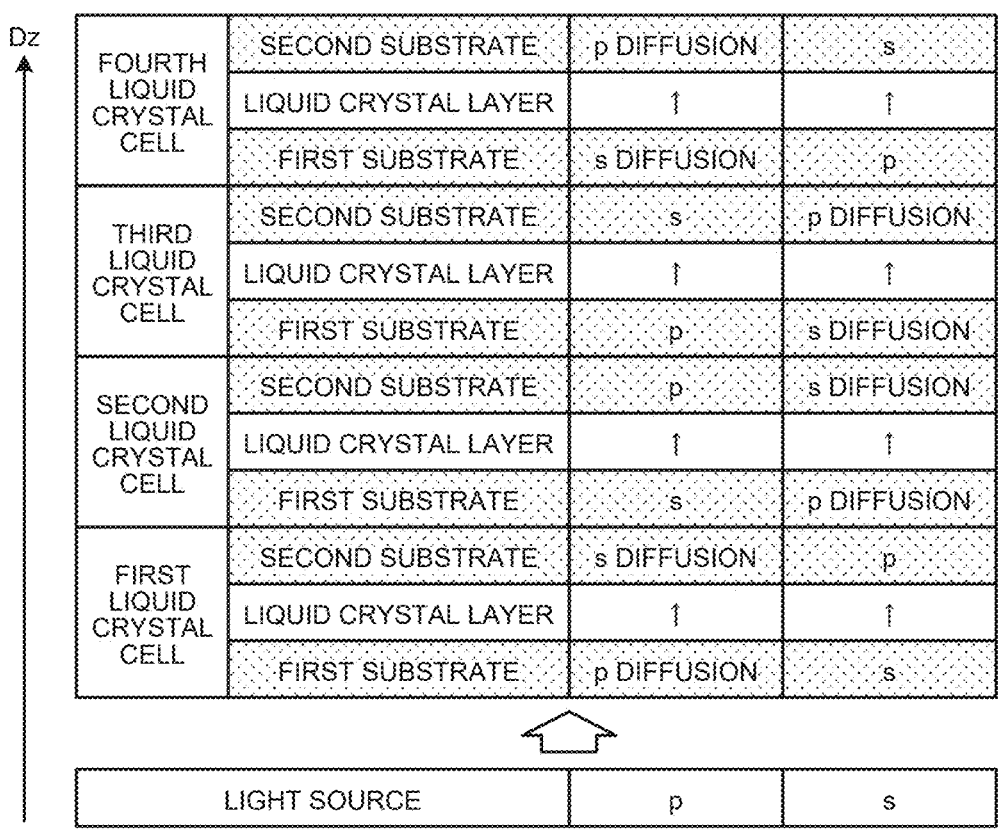

CONTROL DEVICE FOR ILLUMINATION DEVICE, AND ILLUMINATION SYSTEM

CROSS-REFERENCE TO RELATED APPLICATION

This application claims the benefit of priority from Japanese Patent Application No. 2022-102163 filed on Jun. 24, 2022 and International Patent Application No. PCT/JP2023/023345 filed on Jun. 23, 2023, the entire contents of which are incorporated herein by reference.

BACKGROUND

1. Technical Field

What is disclosed herein relates to a control device for an illumination device, and an illumination system.

2. Description of the Related Art

In a conventional illumination instrument, a light source such as an LED is combined with a thin lens provided with a prism pattern, and the distance between the light source and the thin lens is changed to change a light distribution angle. An illumination instrument has been disclosed in which the front of a transparent light bulb is covered by a liquid crystal light adjustment element and the transmittance of a liquid crystal layer is changed to switch between directly-reaching light and scattering light (refer to Japanese Patent Application Laid-open Publication No. H2-65001, for example).

For example, in an illumination device using a liquid crystal cell for p-wave polarization and a liquid crystal cell for s-wave polarization, it is possible to control the diffusion degree of light in two directions by driving both the liquid crystal cells. For such an illumination device capable of controlling the diffusion degree of light in two directions in this manner, a control device with which it is possible to intuitively set the diffusion degree of light in the two directions is desired.

For the foregoing reasons, there is a need for a control device for an illumination device with which it is possible to intuitively set the diffusion degree of light in two directions, and an illumination system.

SUMMARY

A control device for an illumination device according to an aspect of the present disclosure is capable of controlling a light distribution state of light emitted from a light source in two directions of a first direction and a second direction intersecting the first direction and includes: a touch sensor having a detection region provided with a plurality of detection elements; and a display panel provided with a display region overlapping the detection region of the touch sensor in a plan view. A light diffusion degree setting screen for executing light diffusion degree setting processing for the illumination device is displayed on the display region of the display panel. An X direction corresponding to the first direction, a Y direction corresponding to the second direction, and an XY plane with an origin at a predetermined position on the light diffusion degree setting screen are defined for the light diffusion degree setting screen. The light diffusion degree setting screen is provided with a light distribution shape object with a central point at the origin of the XY plane, a first light diffusion degree setting object with a central point at an intersection point of an X axis of the XY plane and an outline of the light distribution shape object, and a second light diffusion degree setting object with a central point at an intersection point of a Y axis of the XY plane and the outline of the light distribution shape object.

An illumination system according to an aspect of the present disclosure includes: a light source and an optical element provided on an optical axis of the light source and capable of controlling a light distribution state of light emitted from the light source in two directions of a first direction and a second direction intersecting the first direction; and a control device configured to control the illumination device to change the light distribution state. The control device includes a touch sensor having a detection region provided with a plurality of detection elements, and a display panel provided with a display region overlapping the detection region of the touch sensor in a plan view. A light diffusion degree setting screen for executing light diffusion degree setting processing for the illumination device is displayed on the display region of the display panel. An X direction corresponding to the first direction, a Y direction corresponding to the second direction, and an XY plane with an origin at a predetermined position on the light diffusion degree setting screen are defined for the light diffusion degree setting screen. The light diffusion degree setting screen is provided with a light distribution shape object with a central point at the origin of the XY plane, a first light diffusion degree setting object with a central point at an intersection point of an X axis of the XY plane and an outline of the light distribution shape object, and a second light diffusion degree setting object with a central point at an intersection point of a Y axis of the XY plane and the outline of the light distribution shape object.

BRIEF DESCRIPTION OF THE DRAWINGS

FIG. 8B is a conceptual diagram for description of change in shape of light through the optical element according to the embodiment;

DETAILED DESCRIPTION

Aspects (embodiments) of the present disclosure will be described below in detail with reference to the accompanying drawings. Contents described below in the embodiments do not limit the present invention. Components described below include those that could be easily thought of by the skilled person in the art and those identical in effect. Components described below may be combined as appropriate. What is disclosed herein is merely exemplary, and any modification that could be easily thought of by the skilled person in the art as appropriate without departing from the gist of the invention is contained in the scope of the present invention. For clearer description, the drawings are schematically illustrated for the width, thickness, shape, and the like of each component as compared to an actual aspect in some cases, but the drawings are merely exemplary and do not limit interpretation of the present invention In the present specification and drawings, any element same as that already described with reference to an already described drawing is denoted by the same reference sign, and detailed description thereof is omitted as appropriate in some cases.

Figure 1A:
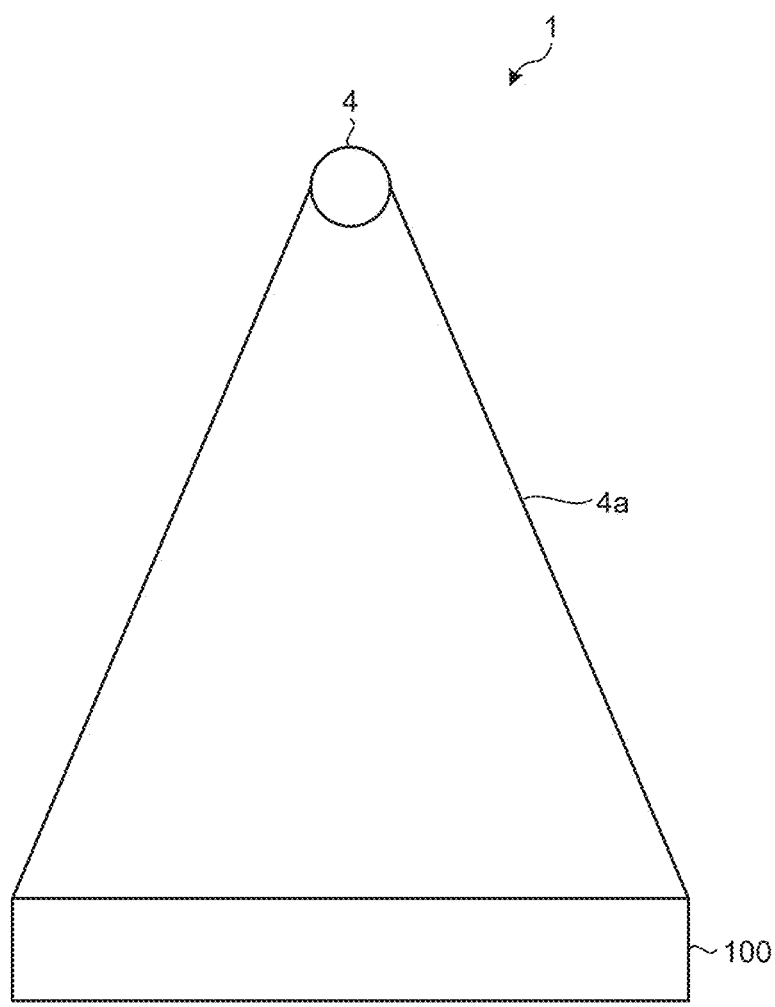
FIG. 1A is a side view illustrating an example of an illumination device according to an embodiment.
Figure 1B:
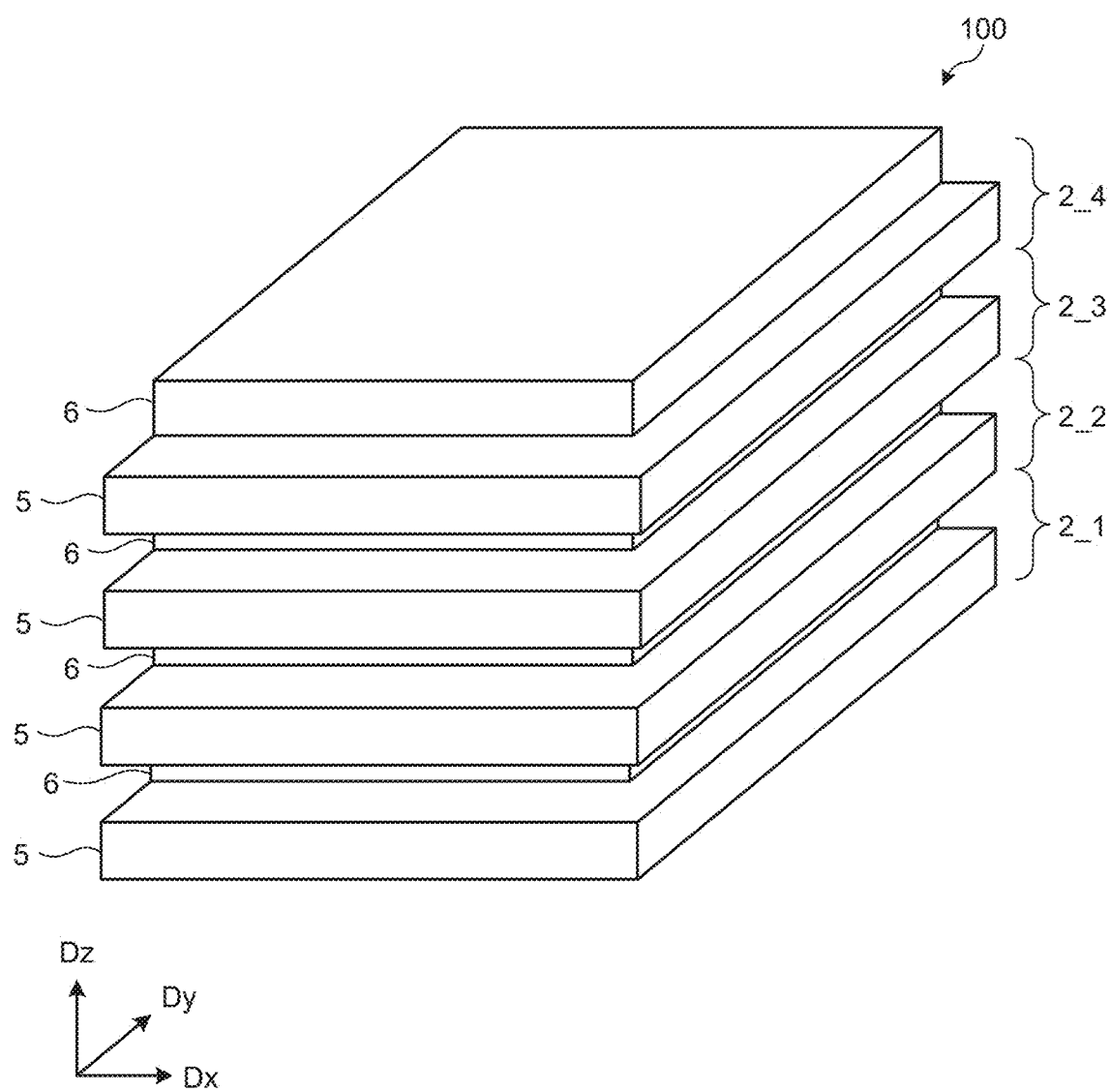
FIG. 1B is a perspective view illustrating an example of an optical element according to the embodiment.

FIG. 1A is a side view illustrating an example of an illumination device 1 according to an embodiment. FIG. 1B is a perspective view illustrating an example of an optical element 100 according to the embodiment. As illustrated in FIG. 1A, the illumination device 1 includes a light source 4, a reflector 4a, and the optical element 100. As illustrated in FIG. 1B, the optical element 100 includes a first liquid crystal cell 2_1, a second liquid crystal cell 2_2, a third liquid crystal cell 2_3, and a fourth liquid crystal cell 2_4. The light source 4 is configured with, for example, a light emitting diode (LED). The reflector 4a is a component that condenses light from the light source 4 to the optical element 100.

In FIG. 1B, a Dz direction indicates the emission direction of light from the light source 4 and the reflector 4a. The optical element 100 has a configuration in which the first liquid crystal cell 2_1, the second liquid crystal cell 2_2, the third liquid crystal cell 2_3, and the fourth liquid crystal cell 2_4 are stacked in the Dz direction. In the present disclosure, the optical element 100 has a configuration in which the first liquid crystal cell 2_1, the second liquid crystal cell 2_2, the third liquid crystal cell 2_3, and the fourth liquid crystal cell 2_4 are sequentially stacked from the light source 4 side (lower side in FIG. 1B). In FIG. 1B, one direction in a plane orthogonal to the Dz direction and parallel to stacking surfaces of the first liquid crystal cell 2_1, the second liquid crystal cell 2_2, the third liquid crystal cell 2_3, and the fourth liquid crystal cell 2_4 is defined as a Dx direction (first direction), and a direction orthogonal to both the Dx direction and the Dz direction is defined as a Dy direction (second direction).

The first liquid crystal cell 2_1, the second liquid crystal cell 2_2, the third liquid crystal cell 2_3, and the fourth liquid crystal cell 2_4 have the same configuration. In the present disclosure, the first liquid crystal cell 2_1 and the fourth liquid crystal cell 2_4 are liquid crystal cells for p-wave polarization. The second liquid crystal cell 2_2 and the third liquid crystal cell 2_3 are liquid crystal cells for s-wave polarization. Hereinafter, the first liquid crystal cell 2_1, the second liquid crystal cell 2_2, the third liquid crystal cell 2_3, and the fourth liquid crystal cell 2_4 are also collectively referred to as "liquid crystal cells 2".

Figure 2:
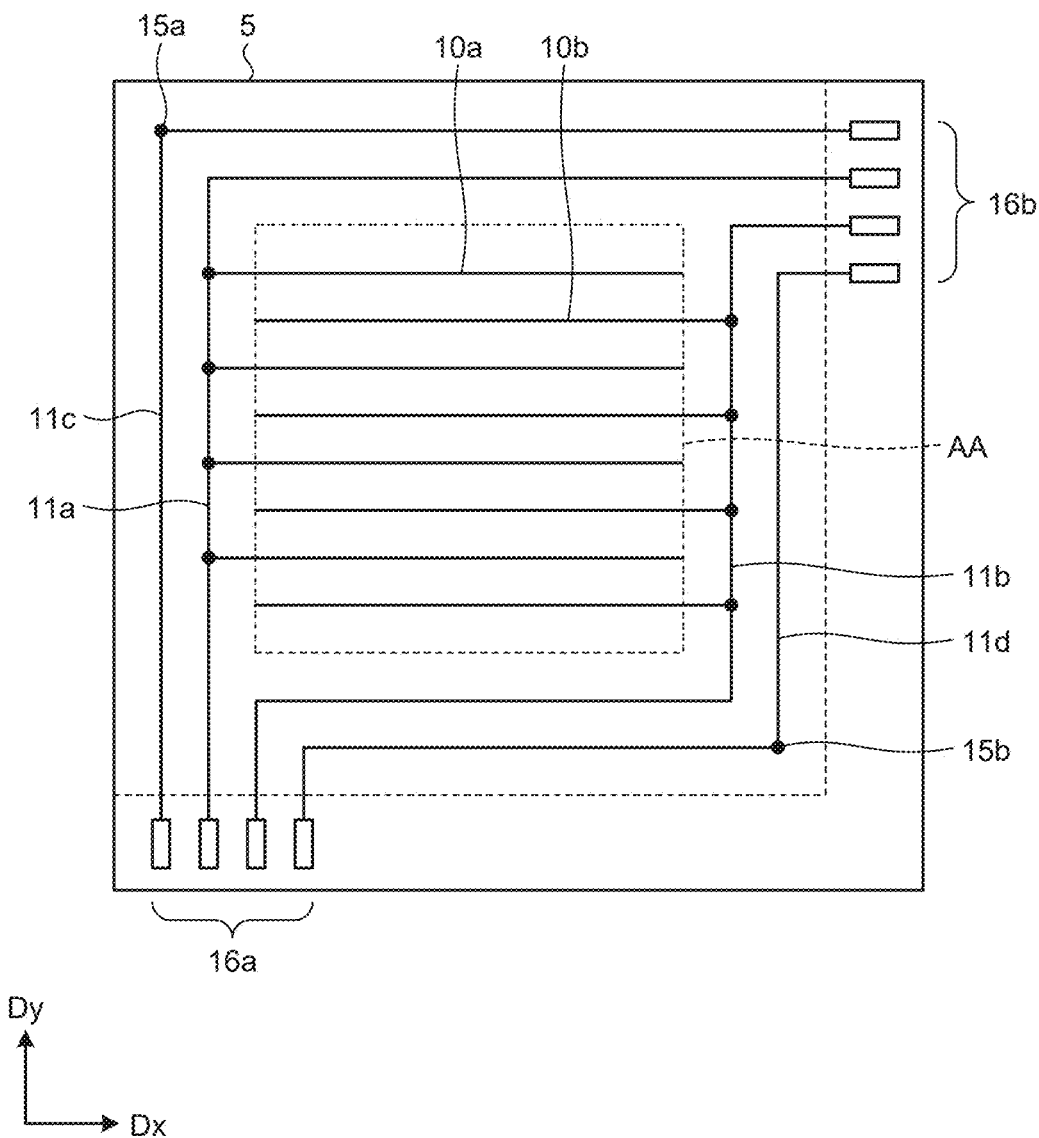
FIG. 2 is a schematic plan view of a first substrate when viewed in a Dz direction.
Figure 3:
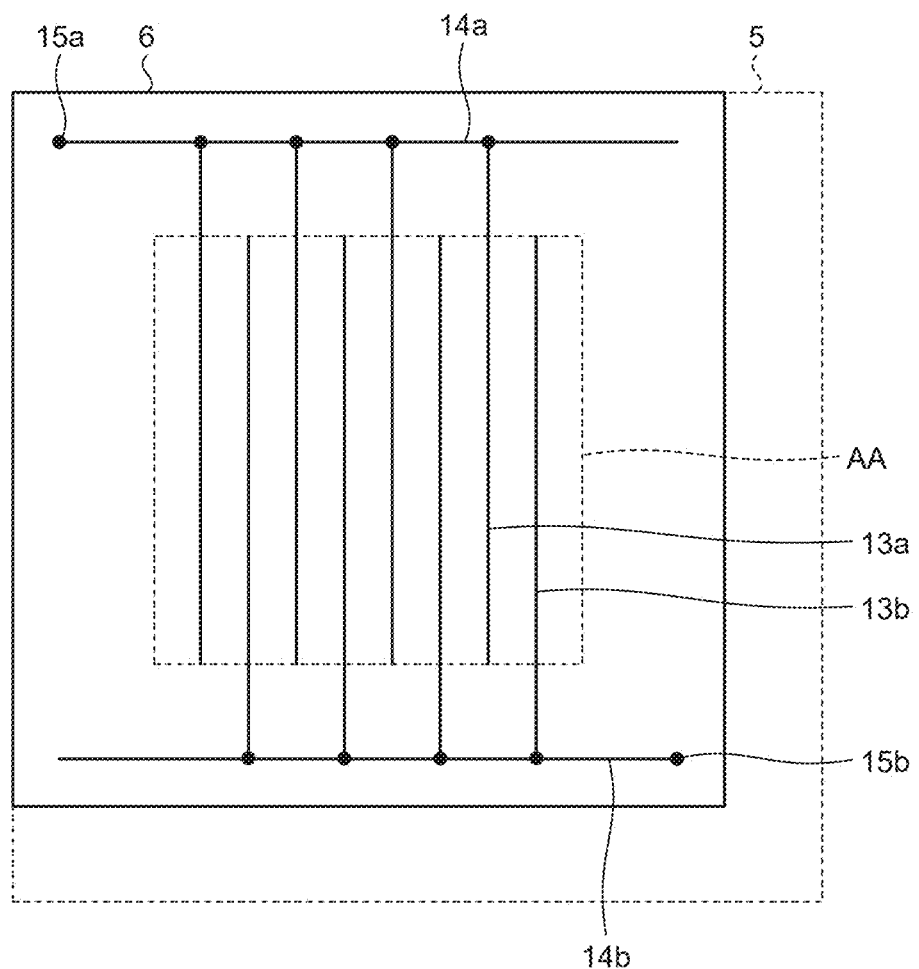
FIG. 3 is a schematic plan view of a second substrate when viewed in the Dz direction.
Figure 4:
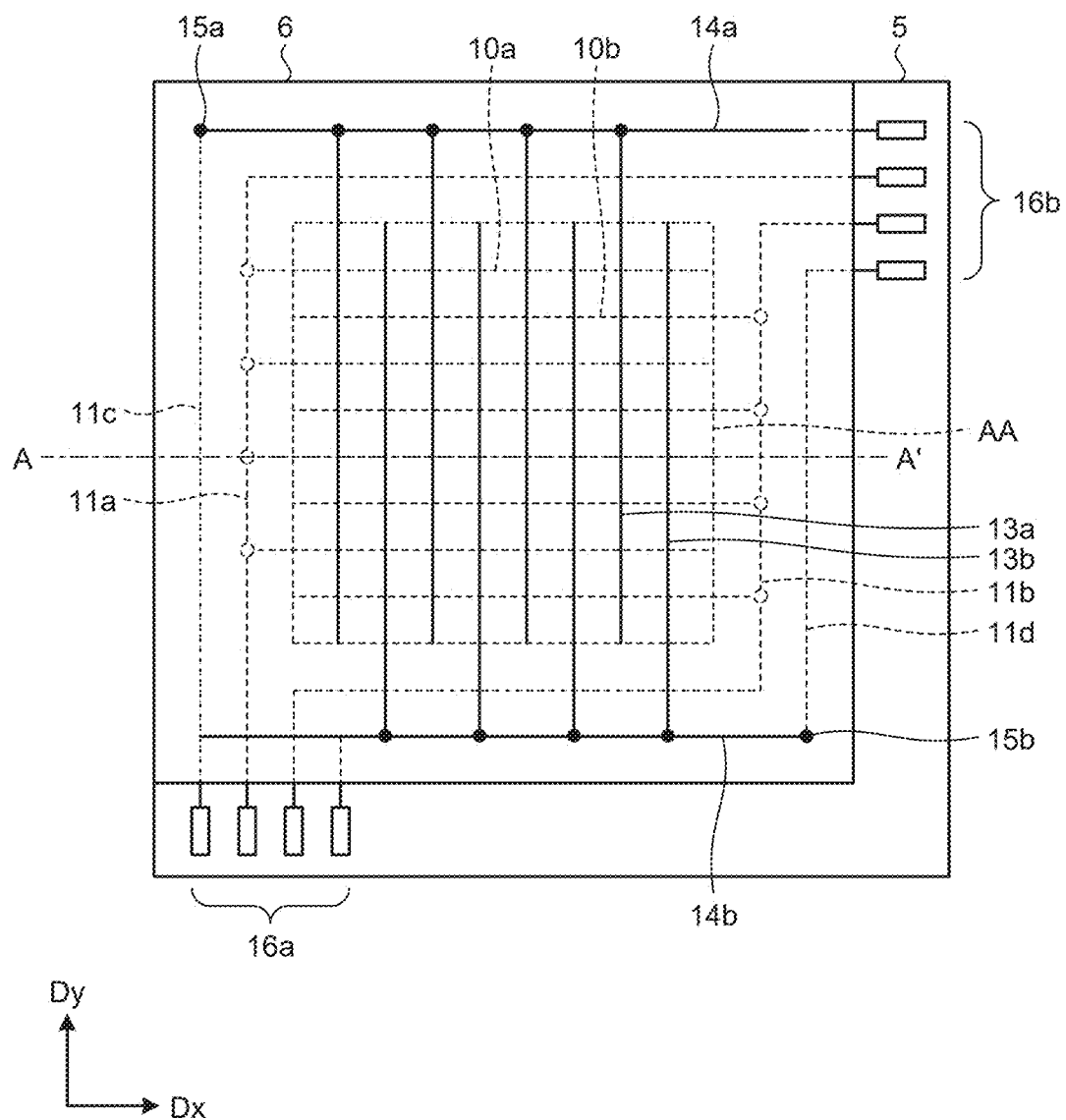
FIG. 4 is a see-through diagram of a liquid crystal cell in which the first substrate and the second substrate are stacked in the Dz direction.
Figure 5:
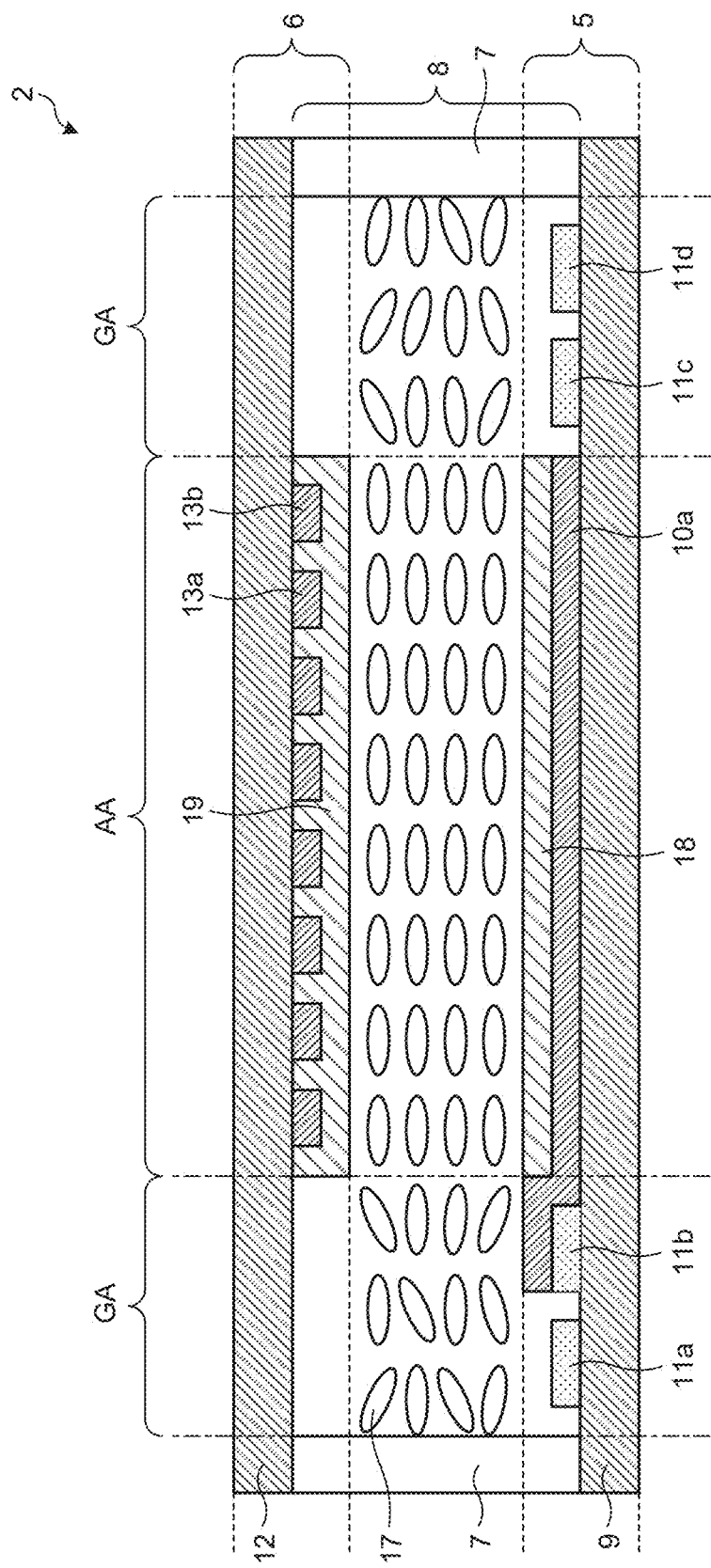
FIG. 5 is a sectional view along line A-A' illustrated in FIG. 4.

Each liquid crystal cell 2 includes a first substrate 5 and a second substrate 6. FIG. 2 is a schematic plan view of the first substrate 5 when viewed in the Dz direction. FIG. 3 is a schematic plan view of the second substrate 6 when viewed in the Dz direction. In FIG. 3, drive electrodes are visible through the substrates, but for clarity, the drive electrodes and wiring lines are illustrated with solid lines. FIG. 4 is a see-through diagram of a liquid crystal cell obtained by placing the first substrate 5 and the second substrate 6 in the Dz direction. In FIG. 4 as well, for clarity, drive electrodes and wiring lines on the second substrate side are illustrated with solid lines, and drive electrodes and wiring lines on the first substrate side are illustrated with dotted lines. FIG. 5 is a sectional view along line A-A' illustrated in FIG. 4. FIGS. 2, 3, 4, and 5 exemplarily illustrate the third liquid crystal cell 2_3 and the fourth liquid crystal cell 2_4 in which drive electrodes 10*a* and 10*b* of the first substrate 5 extend in the Dx direction and drive electrodes 13*a* and 13*b* of the second substrate 6 extend in the Dy direction.

As illustrated in FIG. 5, the liquid crystal cell 2 includes a liquid crystal layer 8 sealed around its periphery by a sealing member 7 between the first substrate 5 and the second substrate 6.

The liquid crystal layer 8 modulates light passing through the liquid crystal layer 8 in accordance with the state of an electric field. As liquid crystal molecules, positive-type nematic liquid crystals are used, but other liquid crystals with the same effects may be used.

Figure 7:
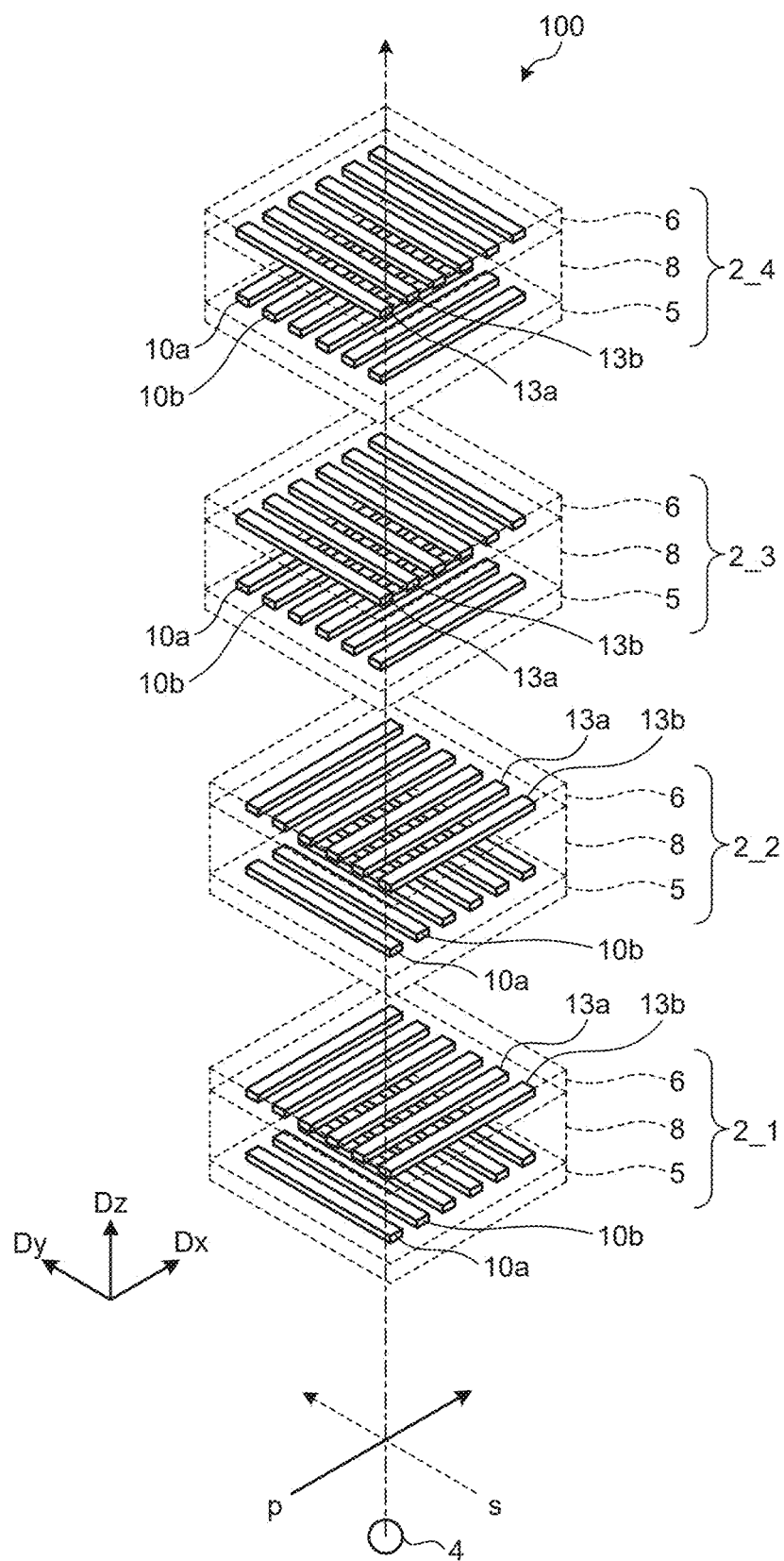
FIG. 7 is a multilayered structure diagram of the optical element according to the embodiment.

As illustrated in FIG. 2, the drive electrodes 10*a* and 10*b*, metal lines 11*a* and 11*b*, and metal lines 11*c* and 11*d* are provided on the liquid crystal layer 8 side of a base member 9 of the first substrate 5. The metal lines 11*a* and 11*b* supply drive voltage that is applied to the drive electrodes 10*a* and 10*b*, and the metal lines 11*c* and 11*d* supply drive voltage that is applied to the drive electrodes 13*a* and 13*b* (refer to FIG. 3) provided on the second substrate 6 to be described later. The metal lines 11*a*, 11*b*, 11*c*, and 11*d* are provided in a wiring layer of the first substrate 5. The metal lines 11*a*, 11*b*, 11*c*, and 11*d* are provided at intervals in the wiring layer on the first substrate 5. Hereinafter, the drive electrodes 10*a* and 10*b* are simply referred to as "drive electrodes 10" in some cases. The metal lines 11*a*, 11*b*, 11*c*, and 11*d* are referred to as "first metal lines 11" in some cases. As illustrated in FIGS. 2 and 7, in the third liquid crystal cell 2_3 and the fourth liquid crystal cell 2_4, the drive electrodes 10 on the first substrate 5 extend in the Dx direction. In the first liquid crystal cell 2_1 and the second liquid crystal cell 2_2, the drive electrodes 10 on the first substrate 5 extend in the Dy direction.

As illustrated in FIG. 3, the drive electrodes 13*a* and 13*b*, and a plurality of metal lines 14*a* and 14*b* that supply drive voltage applied to the drive electrodes 13 are provided on the liquid crystal layer 8 side of a base member 12 of the second substrate 6 illustrated in FIG. 5. The metal lines 14*a* and 14*b* are provided in a wiring layer of the second substrate 6. The metal lines 14*a* and 14*b* are provided at intervals in the wiring layer on the second substrate 6. Hereinafter, the drive electrodes 13*a* and 13*b* are simply referred to as "drive electrodes 13" in some cases. The metal lines 14*a* and 14*b* are referred to as "second metal lines 14" in some cases. As illustrated in FIGS. 3 and 7, in the third liquid crystal cell 2_3 and the fourth liquid crystal cell 2_4, the drive electrodes 13 on the second substrate 6 extend in the Dy direction. In the first liquid crystal cell 2_1 and the second liquid crystal cell 2_2, the drive electrodes 13 on the second substrate 6 extend in the Dx direction.

The drive electrodes 10 and the drive electrodes 13 are light-transmitting electrodes formed of a light-transmitting conductive material (light-transmitting conductive oxide) such as indium tin oxide (ITO). The first substrate 5 and the second substrate 6 are light-transmitting substrates such as glass or resin. The first metal lines 11 and the second metal lines 14 are formed of at least one metallic material selected from aluminum (Al), copper (Cu), silver (Ag), molybdenum (Mo), and alloys thereof. The first metal lines 11 and the second metal lines 14 may be stacked bodies of a plurality of layers using one or more of these metallic materials. At least one metallic material selected from aluminum (Al), copper (Cu), silver (Ag), molybdenum (Mo), and alloys thereof has lower resistance than light-transmitting conductive oxide such as ITO.

The metal line 11*c* of the first substrate 5 and the metal line 14*a* of the second substrate 6 are coupled by a conduction part 15*a* made of, for example, conductive paste. The metal line 11*d* of the first substrate 5 and the metal line 14*b* of the second substrate 6 are coupled by a conduction part 15*b* made of, for example, conductive paste.

In addition, coupling (flex-on-board) terminal parts 16*a* and 16*b* that are coupled to non-illustrated flexible printed circuits (FPC) are provided in regions on the first substrate 5, which do not overlap the second substrate 6 when viewed in the Dz direction. The coupling terminal parts 16*a* and 16*b* each include four coupling terminals corresponding to the metal lines 11*a*, 11*b*, 11*c*, and 11*d*, respectively.

The coupling terminal parts 16*a* and 16*b* are provided in the wiring layer of the first substrate 5. Drive voltage to be applied to the drive electrodes 10*a* and 10*b* on the first substrate 5 and the drive electrodes 13*a* and 13*b* on the second substrate 6 is supplied to the liquid crystal cell 2 from an FPC coupled to the coupling terminal part 16*a* or the coupling terminal part 16*b*. Hereinafter, the coupling terminal parts 16*a* and 16*b* are simply referred to as "coupling terminal parts 16" in some cases.

As illustrated in FIG. 4, in the liquid crystal cell 2, the first substrate 5 and the second substrate 6 are stacked in the Dz direction (irradiation direction of light), and the drive electrodes 10 on the first substrate 5 intersect the drive electrodes 13 on the second substrate 6 when viewed in the Dz direction. In the liquid crystal cell 2 thus configured, the alignment direction of liquid crystal molecules 17 in the liquid crystal layer 8 can be controlled by supplying drive voltage to the drive electrodes 10 on the first substrate 5 and the drive electrodes 13 on the second substrate 6. A region in which the alignment direction of the liquid crystal molecules 17 in the liquid crystal layer 8 can be controlled is referred to as an "effective region AA". The refractive index distribution of the liquid crystal layer 8 is changed in the effective region AA, whereby the diffusion degree of light transmitted through the effective region AA of the liquid crystal cell 2 can be controlled. A region outside the effective region AA, where the liquid crystal layer 8 is sealed by the sealing member 7 is referred to as a "peripheral region GA" (refer to FIG. 5).

As illustrated in FIG. 5, the drive electrodes 10 (in FIG. 5, the drive electrode 10*a*) in the effective region AA of the first substrate 5 are covered by an alignment film 18. The drive electrodes 13 (in FIG. 5, the drive electrodes 13*a* and 13*b*) in the effective region AA of the second substrate 6 are covered by an alignment film 19. The alignment direction of the liquid crystal molecules is different between the alignment film 18 and the alignment film 19.

Figure 6A:
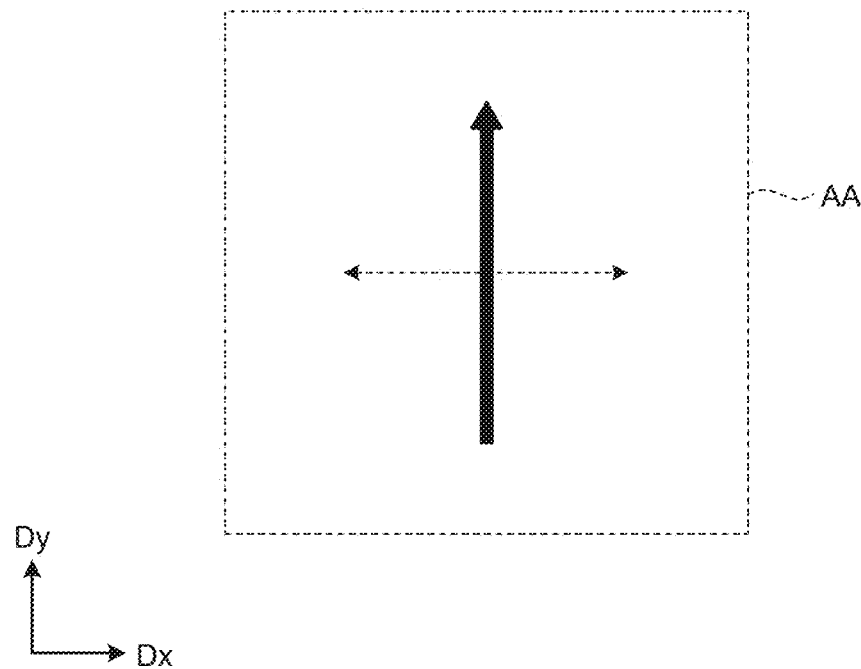
FIG. 6A is a diagram illustrating the alignment direction of an alignment film of the first substrate.
Figure 6B:
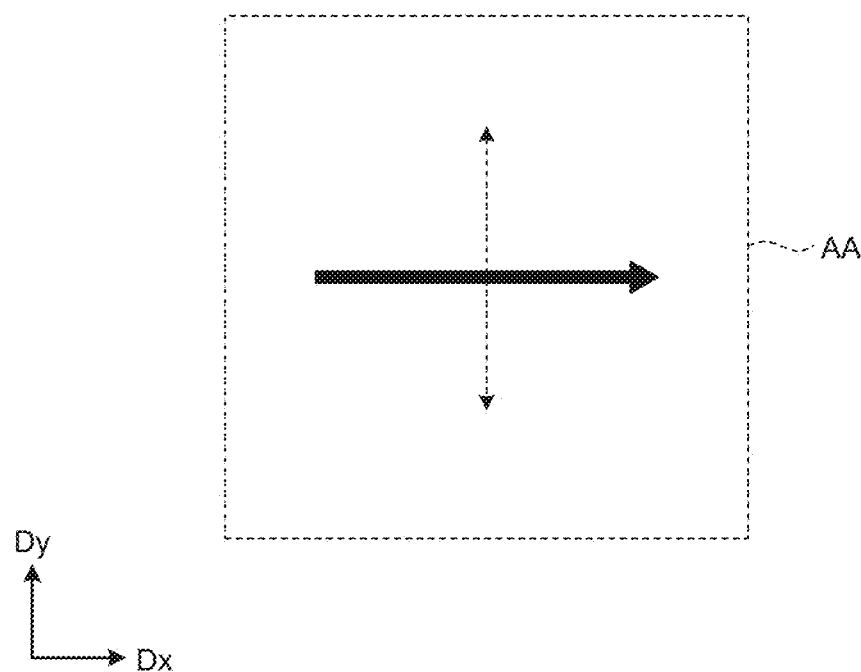
FIG. 6B is a diagram illustrating the alignment direction of an alignment film of the second substrate.

FIG. 6A is a diagram illustrating the alignment direction of the alignment film of the first substrate 5. FIG. 6B is a diagram illustrating the alignment direction of the alignment film of the second substrate 6.

As illustrated in FIGS. 6A and 6B, the alignment direction of the alignment film 18 of the first substrate 5 and the alignment direction of the alignment film 19 of the second substrate 6 are directions intersecting each other in a plan view. Specifically, as illustrated with a solid arrow in FIG. 6A, the alignment direction of the alignment film 18 of the first substrate 5 is orthogonal to the extending direction of the drive electrodes 10a and 10b, which is illustrated with a dashed arrow in FIG. 6A. As illustrated with a solid arrow in FIG. 6B, the alignment direction of the alignment film 19 of the second substrate 6 is orthogonal to the extending direction of the drive electrodes 13a and 13b, which is illustrated with a dashed arrow in FIG. 6B. In the following description, the extending directions of the drive electrodes 10 and 13 are orthogonal to the alignment directions of the alignment films 18 and 19 covering them, but these may intersect at an angle other than orthogonal, for example, in the angle range of 85° to 90°. The drive electrodes 10 on the first substrate 5 side and the drive electrodes 13 on the second substrate 6 side are preferably orthogonal to each other but may intersect, for example, in the angle range of 85° to 90°. The alignment directions of the alignment films 18 and 19 are formed by rubbing processing or light alignment processing.

A mechanism for changing the shape of light by using the liquid crystal cells 2 (the first liquid crystal cell 2_1, the second liquid crystal cell 2_2, the third liquid crystal cell 2_3, and the fourth liquid crystal cell 2_4) will be described below. FIG. 7 is a multilayered structure diagram of the optical element 100 according to the embodiment. FIGS. 8A, 8B, 8C, and 8D are conceptual diagrams for description of change in shape of light through the optical element 100 according to the embodiment. FIGS. 8A, 8B, 8C, and 8D illustrate examples in which potential difference is generated between the drive electrodes of hatched substrates of the liquid crystal cells 2.

As illustrated in FIG. 7, the optical element 100 is provided on the optical axis of the light source 4, which is illustrated with a dashed and single-dotted line, and as described above, the first liquid crystal cell 2_1, the second liquid crystal cell 2_2, the third liquid crystal cell 2_3, and the fourth liquid crystal cell 2_4 are sequentially stacked from the light source 4 side (lower side in FIG. 7). The third liquid crystal cell 2_3 and the fourth liquid crystal cell 2_4 are stacked in a state of being rotated by 90° relative to the first liquid crystal cell 2_1 and the second liquid crystal cell 2_2.

In each liquid crystal cell 2, the alignment direction of the alignment film on the first substrate 5 side and the alignment direction of the alignment film on the second substrate 6 side intersect each other as illustrated in FIGS. 6A and 6B. Accordingly, from the first substrate 5 side toward the second substrate 6 side, the orientation of the liquid crystal molecules in the liquid crystal layer 8 gradually changes from the Dx direction to the Dy direction (or from the Dy direction to the Dx direction), and the polarized light component of transmitted light rotates along with the change. Specifically, in the liquid crystal cell 2, the polarized light component, which is a p-polarized component on the first substrate 5 side, changes to an s-polarized light component as distance from the second substrate 6 decreases; and the polarized light component, which is an s-polarized light component on the first substrate 5 side, changes to a p-polarized component as distance from the second substrate 6 decreases. This rotation of the polarized light component may be referred to as optical rotation.

Figure 8A:
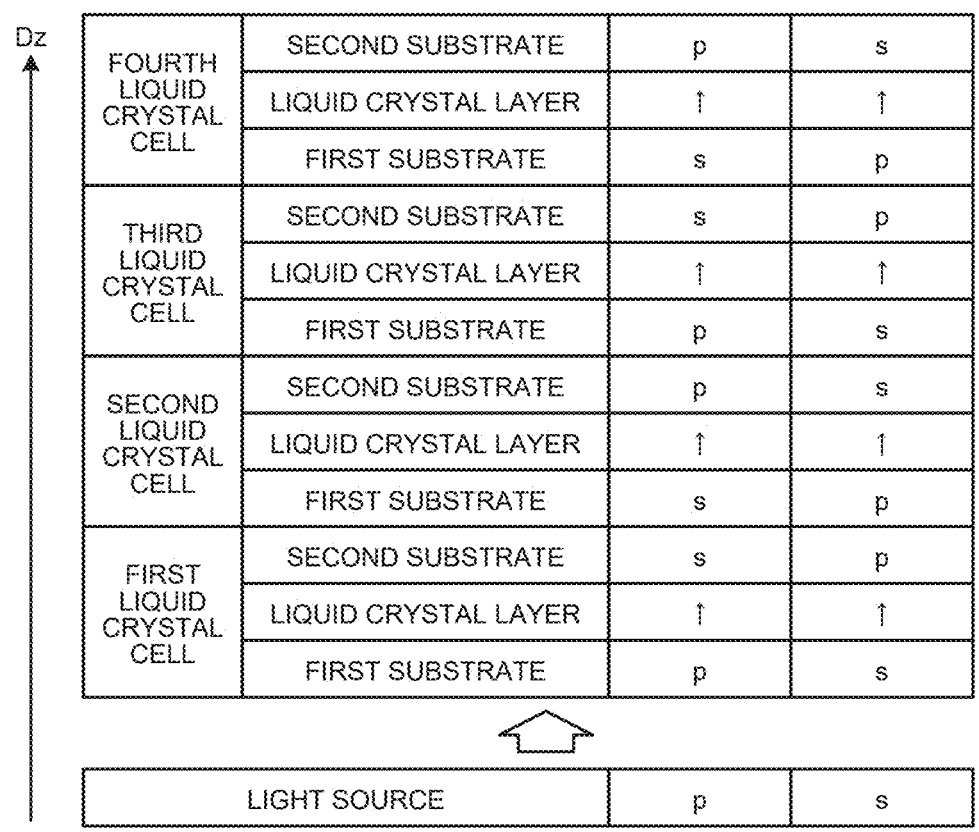
FIG. 8A is a conceptual diagram for description of change in shape of light through the optical element according to the embodiment.

FIG. 8A illustrates a state in which no potential is generated between adjacent electrodes in each liquid crystal cell 2. In this case, only optical rotation occurs in each liquid crystal cell 2 and no polarized light component is diffused.

As illustrated in FIG. 8B, for example, when potential difference is generated between the drive electrodes 10a and 10b on the first substrate 5 in the first liquid crystal cell 2_1, the liquid crystal molecules between the electrodes are aligned in a circular arc shape, and thus, refractive index distribution is formed in the Dx direction in the liquid crystal layer 8. As light from the light source 4 is transmitted in this state, the above-described refractive index distribution acts on the polarized light component (in FIG. 8B, p-polarized component) parallel to the Dx direction, and therefore, the p-polarized component diffuses in the Dx direction.

In addition, when potential difference is generated between the drive electrodes 13a and 13b on the second substrate 6 in the first liquid crystal cell 2_1, refractive index distribution is formed in the Dy direction on the second substrate 6 side, and thus, the s-polarized light component diffuses in the Dy direction on the second substrate 6 side. Specifically, the polarized light component having changed from a p-polarized component to an s-polarized light component during passing through the liquid crystal layer 8 in the first liquid crystal cell 2_1 diffuses in the Dy direction as well. However, the s-polarized light component at incidence on the first liquid crystal cell 2_1 optically rotates during passing through the liquid crystal layer 8 but intersects each refractive index distribution, and therefore, only optically rotates without diffusing and passes through the first liquid crystal cell 2_1.

The s-polarized light component at incidence on the first liquid crystal cell 2_1 changes to a p-polarized component after passing through the first liquid crystal cell 2_1, and the second liquid crystal cell 2_2 acts on this p-polarized component. Specifically, as illustrated in FIGS. 8A and 8B, the first liquid crystal cell 2_1 acts on the p-polarized component of light incident on the optical element 100, and the second liquid crystal cell 2_2 acts on the s-polarized light component thereof. Since the third liquid crystal cell 2_3 and the fourth liquid crystal cell 2_4 are provided with rotation by 90° relative to the first liquid crystal cell 2_1 and the second liquid crystal cell 2_2, polarized light components on which they act are switched by 90°. Specifically, the third liquid crystal cell 2_3 acts on the s-polarized light component at incidence on the optical element 100, and the fourth liquid crystal cell 2_4 acts on the p-polarized component at incidence on the optical element 100.

Figure 8C:
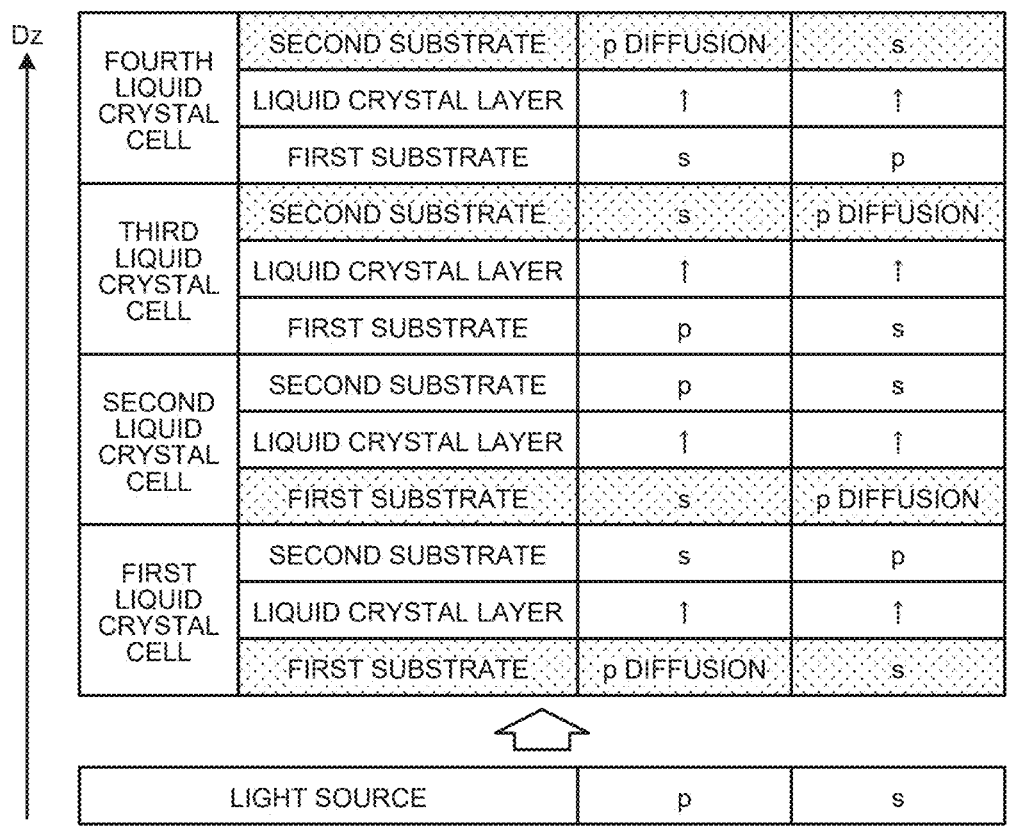
FIG. 8C is a conceptual diagram for description of change in shape of light through the optical element according to the embodiment.

As illustrated in FIG. 8C, in the optical element, it is possible to act on the p-polarized component by providing potential difference between drive electrodes extending in the Dy direction in each liquid crystal cell 2 (between the drive electrodes 10a and 10b of the first substrate 5 in the first liquid crystal cell 2_1 and the second liquid crystal cell 2_2 and between the drive electrodes 13a and 13b of the second substrate 6 in the third liquid crystal cell 2_3 and the fourth liquid crystal cell 2_4), thereby increasing the shape of light mainly in the Dx direction. This effect may be referred to as horizontal diffusion.

Figure 8D:
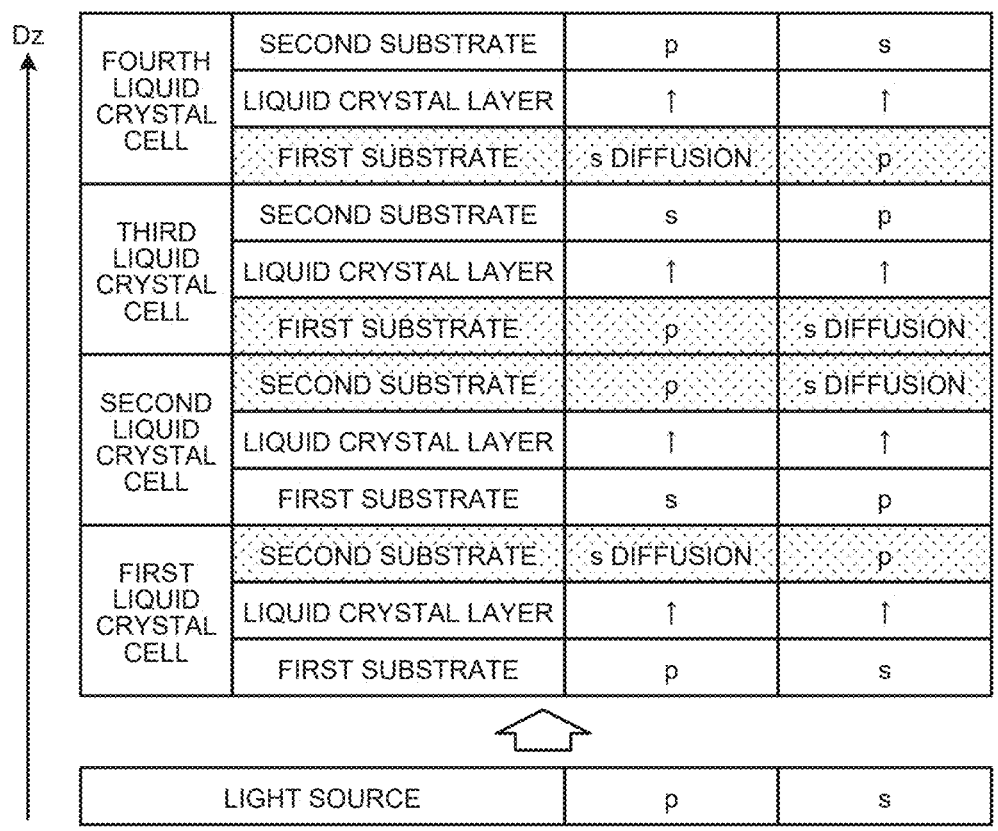
FIG. 8D is a conceptual diagram for description of change in shape of light through the optical element according to the embodiment.

As illustrated in FIG. 8D, it is possible to act on the s-polarized light component by providing potential difference between drive electrodes extending in the Dx direction in each liquid crystal cell 2 (between the drive electrodes 13a and 13b of the second substrate 6 in the first liquid crystal cell 2_1 and the second liquid crystal cell 2_2 and between the drive electrodes 10a and 10b of the first substrate 5 in the third liquid crystal cell 2_3 and the fourth liquid crystal cell 2_4), thereby increasing the shape of light mainly in the Dy direction. This effect may be referred to as vertical diffusion.

The diffusion degree of light in each direction depends on the potential difference between the drive electrodes 10a and 10b (or between the drive electrodes 13a and 13b) adjacent to each other. The spread of light in the direction is maximum (100%) in a case where the potential difference between the drive electrodes 10*a* and 10*b* (or between the drive electrodes 13*a* and 13*b*) is maximum potential difference (for example, 30 V) defined in advance, and no spread of light (0%) occurs in the direction in a case where no potential difference is generated. Alternatively, the spread of light in the direction is 50% in a case where the potential difference between the drive electrodes 10*a* and 10*b* (or between the drive electrodes 13*a* and 13*b*) is 50% (for example, 15 V) of the above-described maximum potential difference.

In each liquid crystal cell 2, the interval (is also referred to as a cell gap) between its substrates (between the first substrate 5 and the second substrate 6) is large and is 30 μm to 50 μm approximately, and thus, influence of an electric field formed in one of the substrates on the other substrate side is reduced as much as possible. Drive voltage that generates potential difference between the drive electrodes 10*a* and 10*b* (or between the drive electrodes 13*a* and 13*b*) adjacent to each other is what is called an alternating-current square wave, thereby preventing burn-in of the liquid crystal molecules.

The alignment directions of the alignment films, the extending directions of the drive electrodes on the substrates, and the angle between them may be modified as appropriate for the entire optical element 100 or each liquid crystal cell 2 in accordance with the characteristics of liquid crystals to be employed and optical characteristics to be intentionally obtained.

In the present embodiment, description is made on the configuration of the optical element 100 in which the four liquid crystal cells of the first liquid crystal cell 2_1, the second liquid crystal cell 2_2, the third liquid crystal cell 2_3, and the fourth liquid crystal cell 2_4 are stacked, but the optical element 100 is not limited to this configuration and may employ, for example, a configuration in which two or three liquid crystal cells 2 are stacked or a configuration in which a plurality of liquid crystal cells 2, five or more liquid crystal cells 2, are stacked.

In the present disclosure, in the illumination device 1 with the above-described configuration, light incident on the optical element from the light source 4 is controlled in the two directions of the Dx direction and the Dy direction by controlling drive voltage of each liquid crystal cell 2. The above-described vertical diffusion and horizontal diffusion may be collectively referred to as light diffusion. Accordingly, the shape of light emitted from the optical element is changed. The shape of light is a light shape that appears on a plane parallel to an emission surface of the optical element, and this may be referred to as a light distribution shape. The following describes control of the light diffusion degree in the present disclosure with reference to FIG. 9.

Figure 9:
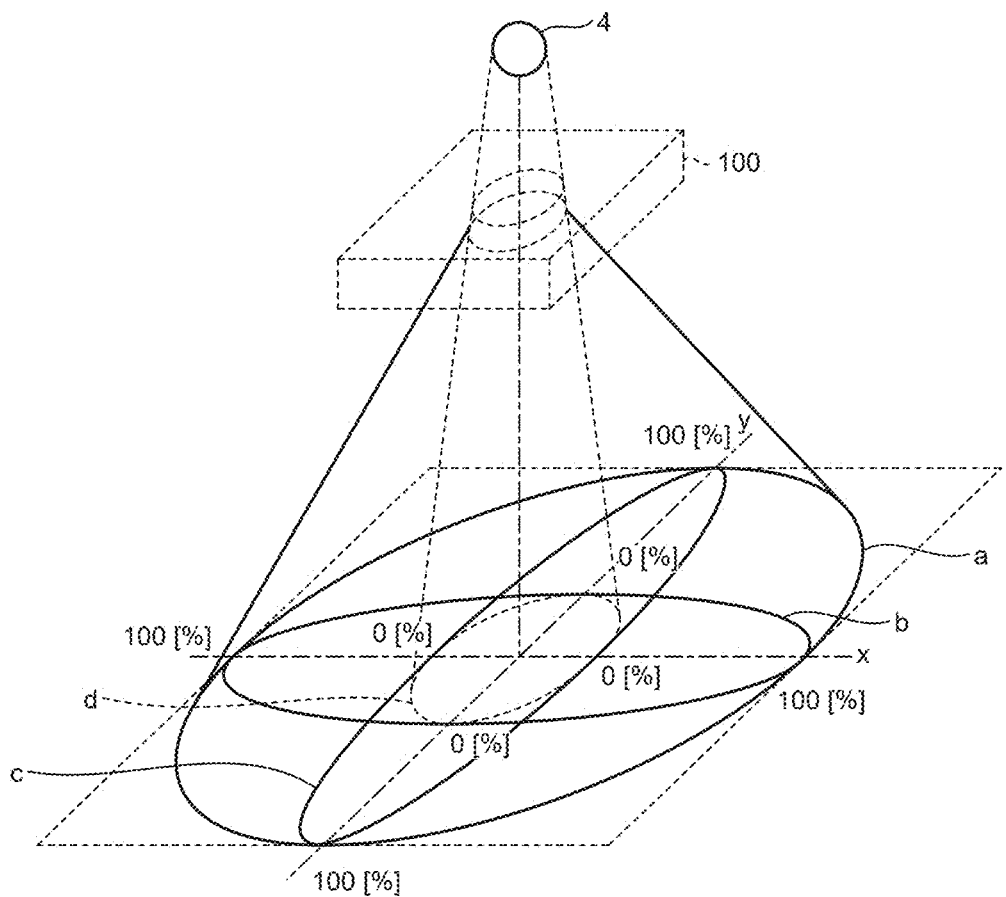
FIG. 9 is a conceptual diagram for conceptually describing control of the light diffusion degree of the illumination device according to the embodiment.
Figure 9:
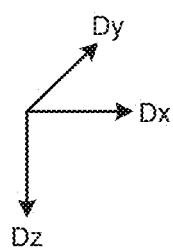

FIG. 9 is a conceptual diagram for conceptually describing control of the light diffusion degree of the illumination device 1 according to the embodiment. FIG. 9 illustrates an irradiation area of light on an imaginary plane xy orthogonal to the Dz direction. The outline of the actual irradiation area is slightly unclear depending on the distance from the light source 4, a light diffraction phenomenon, and the like.

As described above, the drive voltage is supplied to the drive electrodes 10 and 13 of each liquid crystal cell 2 of the optical element 100 provided on the optical axis of the light source 4, whereby the alignment direction of the liquid crystal molecules 17 in the liquid crystal layer 8 is controlled. With this control, the light distribution shape of light emitted from the optical element 100 is controlled.

Specifically, for example, the light distribution shape in the Dx direction changes in accordance with the drive voltage applied to the drive electrodes 10 or drive electrodes 13 extending in the Dy direction in each liquid crystal cell 2 as described above. Such light diffusion in the Dx direction may be referred to as the horizontal diffusion. The light distribution shape in the Dy direction changes in accordance with the drive voltage applied to the drive electrodes 10 or drive electrodes 13 extending in the Dx direction in the first to fourth liquid crystal cells. Such light diffusion in the Dy direction may be referred to as the vertical diffusion.

In the present disclosure, the minimum diffusion degrees of the horizontal diffusion and the vertical diffusion are 0% and the maximum diffusion degrees thereof are 100%. More specifically, in a case where the horizontal diffusion degree is 0%, drive electrodes (for example, the drive electrodes 10 extending in the Dy direction on the first substrate 5 in the first liquid crystal cell 2_1) functioning to expand the light distribution state in the Dx direction do not act on the refractive index distribution of the liquid crystal layer 8. In this case, no potential difference is present between the adjacent drive electrodes 10*a* and 10*b* or no potential is supplied to the electrodes. On the other hand, in a case where the horizontal diffusion degree is 100%, the drive electrodes (for example, the drive electrodes 10 extending in the Dy direction on the first substrate 5 in the first liquid crystal cell 2_1) functioning to expand the light distribution state in the Dx direction maximumly act on the refractive index distribution of the liquid crystal layer 8. In this case, the potential difference between the adjacent drive electrodes 10*a* and 10*b* is set to the maximum potential difference (for example, 30 V) in the optical element 100. In a case where the horizontal diffusion degree is larger than 0% and smaller than 100%, potential adjusted such that the potential difference between the adjacent drive electrodes 10*a* and 10*b* is larger than 0 V and smaller than the maximum potential difference (for example, 30 V) is applied to the electrodes. The same applies to the vertical diffusion.

Outline "a" illustrated in FIG. 9 exemplarily indicates the irradiation area in a case where the horizontal diffusion degree and the vertical diffusion degree are both 100%. Outline "b" illustrated in FIG. 9 exemplarily indicates the irradiation area in a case where the horizontal diffusion degree is 100% and the vertical diffusion degree is 0%. Outline "c" illustrated in FIG. 9 exemplarily indicates the irradiation area in a case where the horizontal diffusion degree is 0% and the vertical diffusion degree is 100%. Outline "d" illustrated in FIG. 9 exemplarily indicates the irradiation area in a case where the horizontal diffusion degree and the vertical diffusion degree are both 0%. In other words, outline "d" indicates the light distribution state when light from the light source 4 is emitted without being controlled by the optical element 100 (or simply transmitting through the optical element 100).

In this manner, in the illumination device 1 with the above-described configuration, it is possible to control the horizontal and vertical diffusion degrees of emission light from the optical element 100 by performing drive voltage control of each liquid crystal cell 2. Thus, it is possible to change the light distribution shape of emission light from the illumination device 1.

Figure 10:
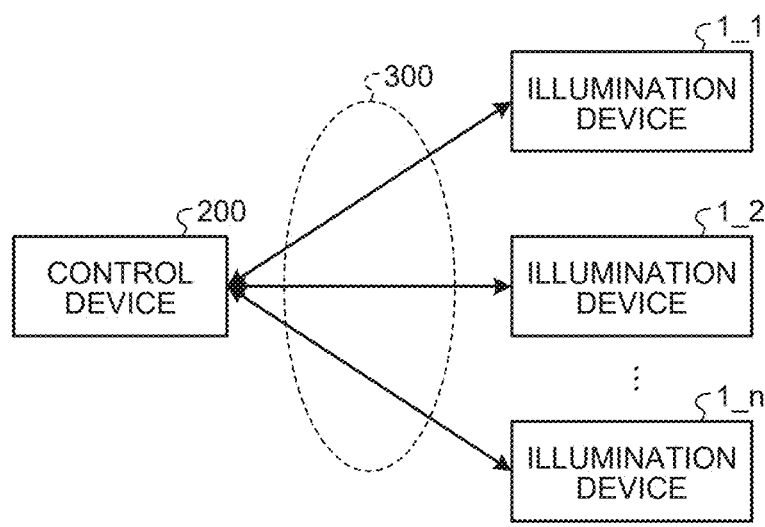
FIG. 10 is a schematic view illustrating an example of the configuration of an illumination system according to the embodiment.

FIG. 10 is a schematic view illustrating an example of the configuration of an illumination system according to the embodiment. The illumination system according to the embodiment includes the illumination device 1 and a control device 200. The control device 200 is, for example, a portable communication terminal device such as a smartphone or a tablet.

Data and various command signals are transmitted bidirectionally between the illumination device 1 and the control device 200 by a communication means 300. In the present disclosure, the communication means 300 is a wireless communication means of, for example, Bluetooth (registered trademark) or WiFi (registered trademark). Wireless communication may be performed between the illumination device 1 and the control device 200 through, for example, a predetermined network such as a mobile communication network. Alternatively, the illumination device 1 and the control device 200 may be coupled by wiring to perform wired communication. FIG. 10 exemplarily illustrates an aspect in which the control device 200 controls illumination devices 1_1, 1_2, ..., 1_n, but the present disclosure is not limited by the number of illumination devices 1 to be controlled by the control device 200.

Figure 11:
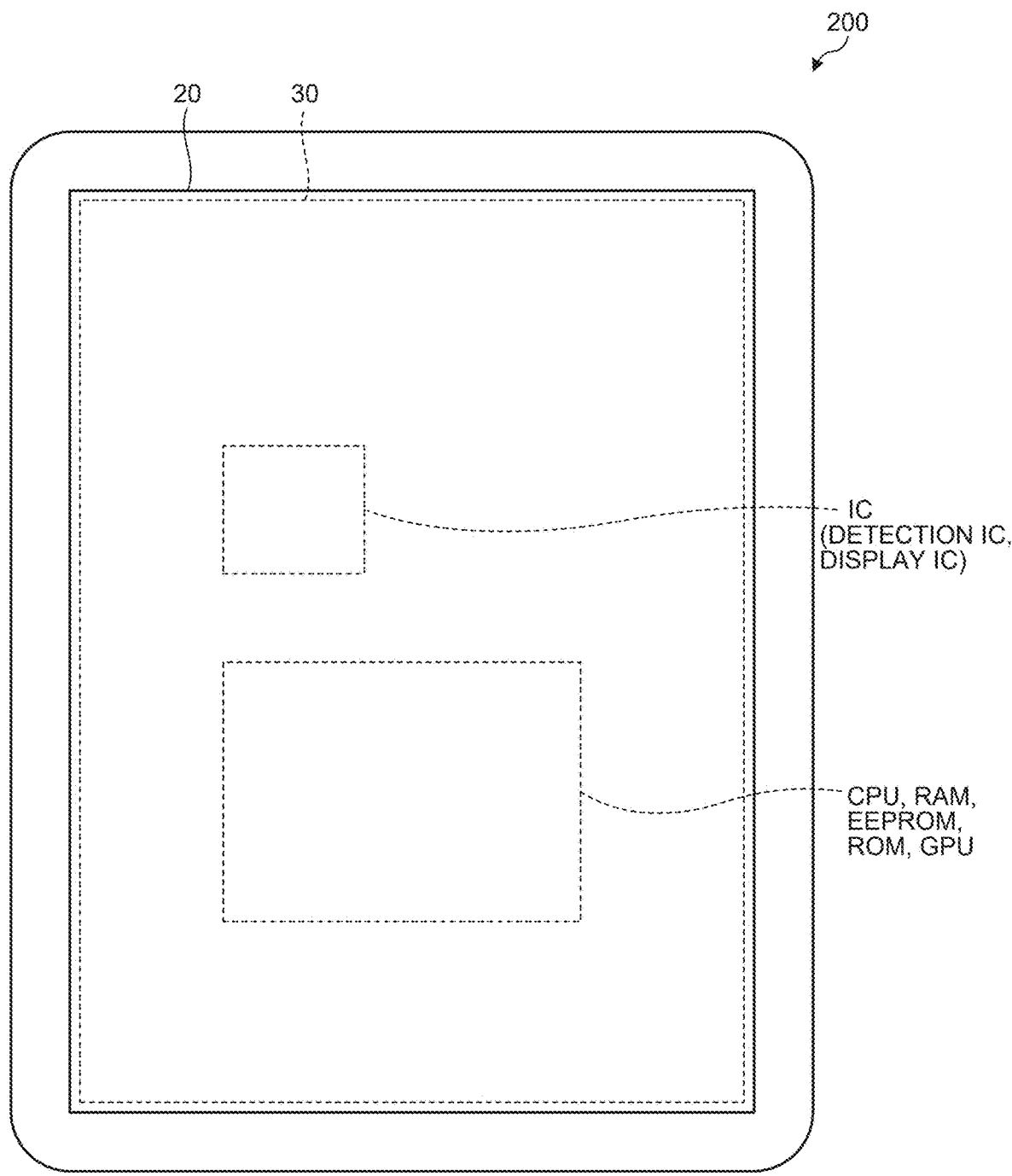
FIG. 11 is an exterior diagram illustrating an example of a control device according to the embodiment.

FIG. 11 is an exterior diagram illustrating an example of the control device 200 according to the embodiment. The control device 200 is a display device (touch screen) with a touch detection function in which a display panel 20 and a touch sensor 30 are integrated. The control device 200 includes, as internal constituent components, for example, various ICs such as a detection IC and a display IC, and a central processing unit (CPU), a random access memory (RAN), an electrically erasable programmable read only memory (EEPROM), a read only memory (ROM), and a graphics processing unit (GPU) of the smartphone, the tablet, or the like constituting the control device 200.

The display panel 20 is what is called an in-cell or hybrid device in which the touch sensor 30 is built and integrated. Building and integrating the touch sensor 30 in the display panel 20 includes, for example, sharing some members such as substrates and electrodes used as the display panel 20 and some members such as substrates and electrodes used as the touch sensor 30. The display panel 20 may be what is called an on-cell device in which the touch sensor 30 is mounted on a display device.

The display panel 20 is, for example, a liquid crystal display panel using a liquid crystal display element. The display panel 20 is not limited thereto but may be, for example, an organic EL display panel (organic light emitting diode (OLED)) or an inorganic EL display panel (micro LED or mini LED).

The touch sensor 30 is, for example, a capacitive touch sensor. The touch sensor 30 is not limited thereto but may be, for example, a touch sensor of a resistance film scheme or a touch sensor of an ultrasonic wave scheme or an optical scheme.

Figure 12:
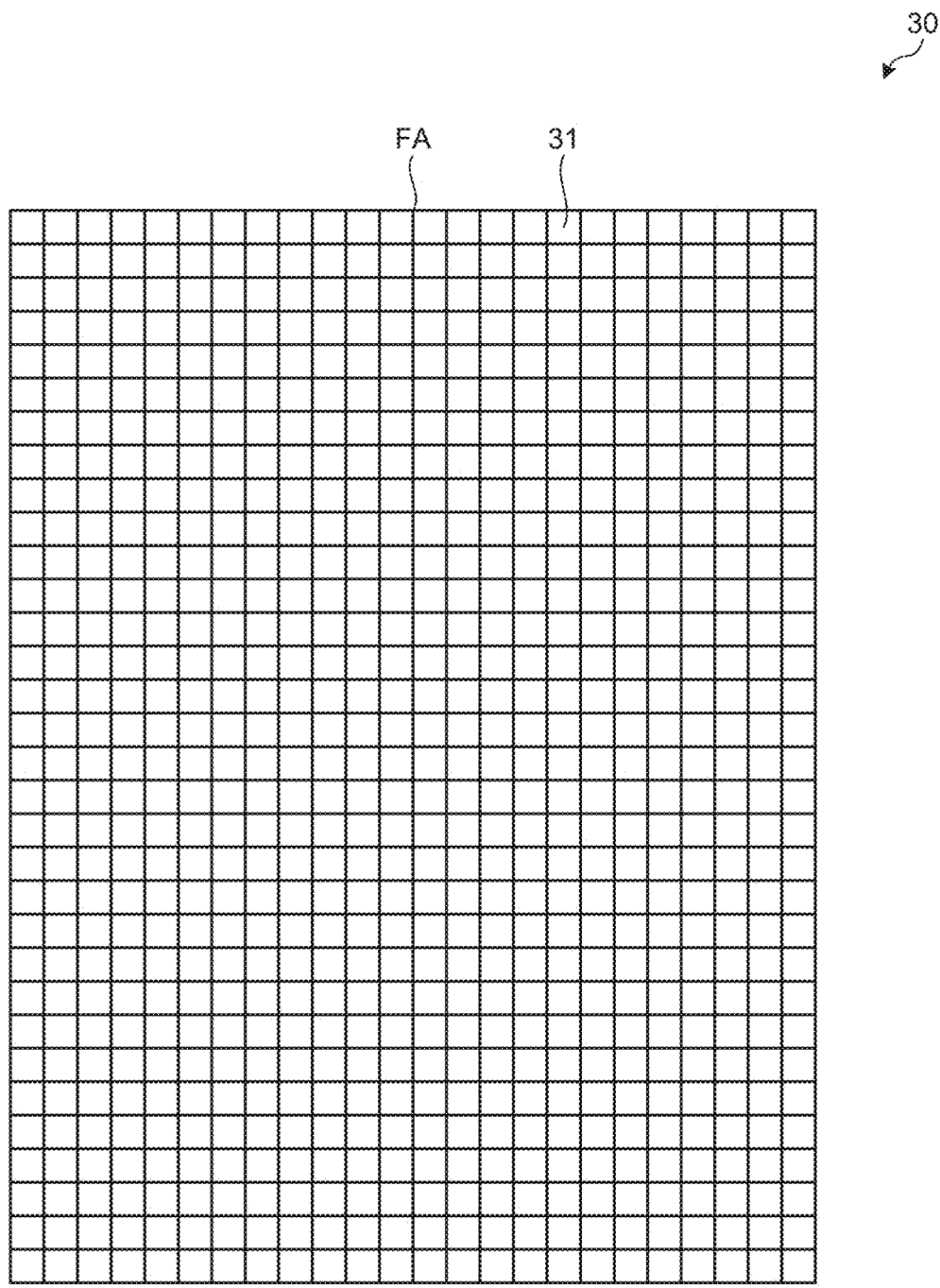
FIG. 12 is a conceptual diagram illustrating an example of a touch detection region on a touch sensor.

FIG. 12 is a conceptual diagram illustrating an example of a touch detection region in the touch sensor 30. A plurality of detection elements 31 are provided in a detection region FA of the touch sensor 30. The detection elements 31 in the detection region FA of the touch sensor 30 are arranged in an X direction and a Y direction orthogonal to the X direction and provided in a matrix of a row-column configuration. In other words, the touch sensor 30 has the detection region FA overlapping the detection elements 31 arranged in the X direction and the Y direction.

Specific configurations and operation for controlling the light diffusion degree of the illumination device 1 in the above-described configuration of the illumination system according to the embodiment will be described below.

First Embodiment

Figure 13:
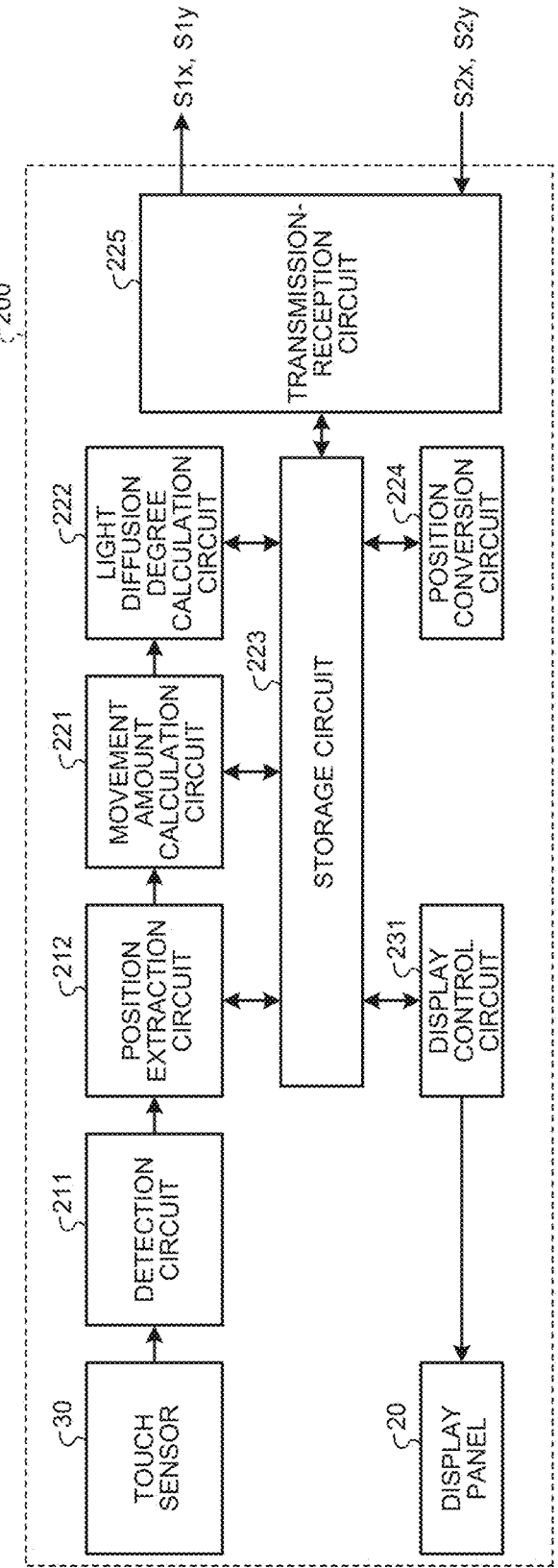
FIG. 13 is a diagram illustrating an example of the control block configuration of a control device according to a first embodiment.

FIG. 13 is a diagram illustrating an example of the control block configuration of the control device 200 according to a first embodiment. The first embodiment describes a control block configuration for executing light diffusion degree setting processing to be described later.

As illustrated in FIG. 13, the control device 200 according to the first embodiment includes the display panel 20, the touch sensor 30, a detection circuit 211, a position extraction circuit 212, a movement amount calculation circuit 221, a light diffusion degree calculation circuit 222, a storage circuit 223, a position conversion circuit 224, a transmission-reception circuit 225, and a display control circuit 231. The detection circuit 211 and the position extraction circuit 212 are configured with, for example, detection ICs. Alternatively, the detection circuit 211, the position extraction circuit 212, and the display control circuit 231 may be mounted as one display IC on the display panel 20 or on an FPC coupled to the display panel 20. The movement amount calculation circuit 221, the light diffusion degree calculation circuit 222, the storage circuit 223, and the position conversion circuit 224 are configured by the CPU, the RAM, the EEPROM, the ROM, and the like of the smartphone, the tablet, or the like constituting the control device 200. The display control circuit 231 may be a display IC mounted on the display panel 20 as described above, and moreover, may include, for example, the GPU of the smartphone, the tablet, or the like constituting the control device 200. The transmission-reception circuit 225 is configured with, for example, a wireless communication module of the smartphone, the tablet, or the like constituting the control device 200.

The detection circuit 211 is a circuit that detects existence of a touch to the touch sensor 30 based on a detection signal output from each detection element 31 of the touch sensor 30.

The position extraction circuit 212 is a logic circuit that obtains, when a touch is detected by the detection circuit 211, the detection position of the touch, that is, the position of a touched object (pictorial image).

The movement amount calculation circuit 221 calculates the movement amount of the touch detection position extracted by the position extraction circuit 212 or an object (pictorial image) that moves while being touched on a light diffusion degree setting screen to be described later. The movement amount calculation circuit 221 is a component configured by, for example, the CPU of the smartphone, the tablet, or the like constituting the control device 200.

The light diffusion degree calculation circuit 222 calculates the diffusion degree of light irradiated from the illumination device 1 as a control target based on the movement amount of the touch detection position calculated by the movement amount calculation circuit 221 or the touched object. The light diffusion degree calculation circuit 222 is a component configured by, for example, the CPU of the smartphone, the tablet, or the like constituting the control device 200.

The storage circuit 223 is composed of, for example, the RAM, EEPROM, and ROM of the smartphone, the tablet, or the like constituting the control device 200. In the present disclosure, the storage circuit 223 stores, for example, the touch detection position or the position of the touched object, which is extracted by the position extraction circuit 212, and the light diffusion degree of the illumination device 1 as a control target. The storage circuit 223 in the present embodiment stores a reference movement amount Px in the X direction and a reference movement amount Py in the Y direction, which are used in light diffusion degree setting processing to be described later. The storage circuit 223 temporarily stores, for example, intermediate data in the light diffusion degree setting processing to be described later. The reference movement amounts Px and Py will be described later.

The position conversion circuit 224 is a component configured by, for example, the CPU of the smartphone, the tablet, or the like constituting the control device 200. The position conversion circuit 224 in the present disclosure converts light diffusion degree information transmitted from the illumination device 1 as a control target into position information indicating a position on a display region of the display panel 20 of the control device 200.

The transmission-reception circuit 225 transmits and receives the light diffusion degree information to and from the illumination device 1. Specifically, the transmission-reception circuit 225 transmits a Dx-direction light diffusion degree S1$x$ and a Dy-direction light diffusion degree S1$y$ to the illumination device 1 as first light diffusion degree information. The transmission-reception circuit 225 receives second light diffusion degree information (a Dx-direction light diffusion degree S2$x$ and a Dy-direction light diffusion degree S2$y$) transmitted from the illumination device 1.

The display control circuit 231 executes display control processing for displaying, on the display panel 20, the light diffusion degree setting screen to be described later. The display control circuit 231 in the present disclosure performs display control of the display panel 20 based on the light diffusion degree information stored in the storage circuit 223 and position information of various pictorial images.

Figure 14:
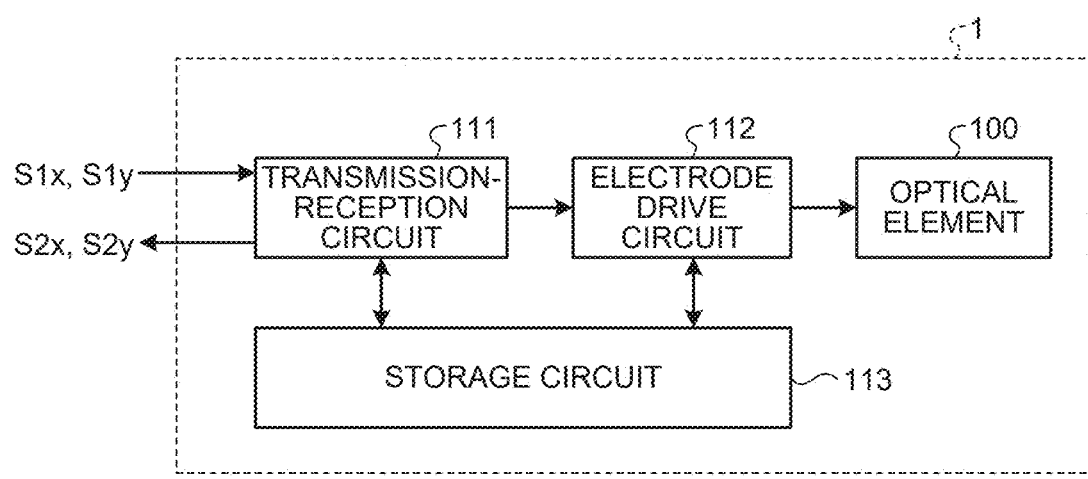
FIG. 14 is a diagram illustrating an example of the control block configuration of an illumination device according to the first embodiment.

FIG. 14 is a diagram illustrating an example of the control block configuration of the illumination device 1 according to the first embodiment. As illustrated in FIG. 14, the illumination device 1 according to the embodiment includes a transmission-reception circuit 111, an electrode drive circuit 112, and a storage circuit 113 as control blocks for controlling the optical element 100 described above.

The transmission-reception circuit 111 transmits and receives the light diffusion degree information to and from the control device 200. Specifically, the transmission-reception circuit 111 receives the first light diffusion degree information (the Dx-direction light diffusion degree S1$x$ and the Dy-direction light diffusion degree S1$y$) transmitted from the control device 200. The transmission-reception circuit 111 transmits, to the control device 200, the Dx-direction light diffusion degree S2$x$ and the Dy-direction light diffusion degree S2$y$ stored in the storage circuit 113 as the second light diffusion degree information.

In the present disclosure, upon startup of the illumination device 1, the transmission-reception circuit 111 transmits, to the control device 200, the Dx-direction light diffusion degree S2$x$ and the Dy-direction light diffusion degree S2$y$ stored in the storage circuit 113 as the second light diffusion degree information and stores, in the storage circuit 113 as the new Dx-direction light diffusion degree S2$x$ and the new Dy-direction light diffusion degree S2$y$, the first light diffusion degree information (the Dx-direction light diffusion degree S1$x$ and the Dy-direction light diffusion degree S1$y$) transmitted from the control device 200 by the light diffusion degree setting processing of the control device 200 to be described later. In other words, when the first light diffusion degree information is transmitted from the control device 200 to the illumination device 1, the second light diffusion degree information is updated to the first light diffusion degree information. The illumination device 1 initially does not store the second light diffusion degree information (0% for the vertical diffusion and the horizontal diffusion). In this case, the first light diffusion degree information is transmitted from the control device 200, whereby the second light diffusion degree information is stored.

The electrode drive circuit 112 supplies drive voltage in accordance with the Dx-direction light diffusion degree S2$x$ and the Dy-direction light diffusion degree S2$y$ stored in the storage circuit 113 to the drive electrodes 10 and 13 of each liquid crystal cell 2 of the optical element 100.

Specifically, upon startup of the illumination device 1, the electrode drive circuit 112 supplies drive voltage corresponding to the second light diffusion degree information stored in the storage circuit 113 to the drive electrodes 10 and 13 of each liquid crystal cell 2 of the optical element 100.

The electrode drive circuit 112 supplies drive voltage corresponding to the second light diffusion degree information updated based on the first light diffusion degree information transmitted from the control device 200 to the drive electrodes 10 and 13 of each liquid crystal cell 2 of the optical element 100.

The storage circuit 113 is composed of, for example, a RAM, an EEPROM, or a ROM. In the present disclosure, the storage circuit 113 stores the final value of the second light diffusion degree information in a previous operation of the illumination device 1.

FIGS. 15A, 15B, 15C, and 15D are conceptual diagrams illustrating an example of the display aspect of the light diffusion degree setting screen of the control device 200 according to the first embodiment. On the light diffusion degree setting screen illustrated in FIGS. 15A, 15B, 15C, and 15D, the X direction is defined as the Dx direction (first direction) in light diffusion degree control of the illumination device 1, and the Y direction is defined as the Dy direction (second direction) in light diffusion degree control of the illumination device 1. An XY plane with an origin O(0, 0) at a predetermined position on the light diffusion degree setting screen is defined.

The display panel 20 is provided with a display region DA overlapping the detection region FA of the touch sensor 30 in a plan view. In the example illustrated in FIGS. 15A, 15B, 15C, and 15D, a light distribution shape object OBJ with a central point at the origin O(0, 0) of the XY plane on the light diffusion degree setting screen is displayed, and a first slider S1 (first light diffusion degree setting object) and a second slider S2 (second light diffusion degree setting object) for operating the light distribution state of the illumination device 1 are disposed on the outline of the light distribution shape object OBJ.

The light distribution shape object OBJ is a pictorial image corresponding to the light distribution state of light emitted from the illumination device 1.

The first slider S1 and the second slider S2 are, for example, pictorial images displayed on the display region DA, which a user can touch and move (drag operation) with a finger.

The shape of the light distribution shape object OBJ can be changed by moving the first slider S1 in the X direction. Simultaneously, the light diffusion degree of the illumination device 1 in the Dx direction is controlled. The shape of the light distribution shape object OBJ can be changed by moving the second slider S2 in the Y direction. Simultaneously, the light diffusion degree of the illumination device 1 in the Dy direction is controlled.

Figure 15A:
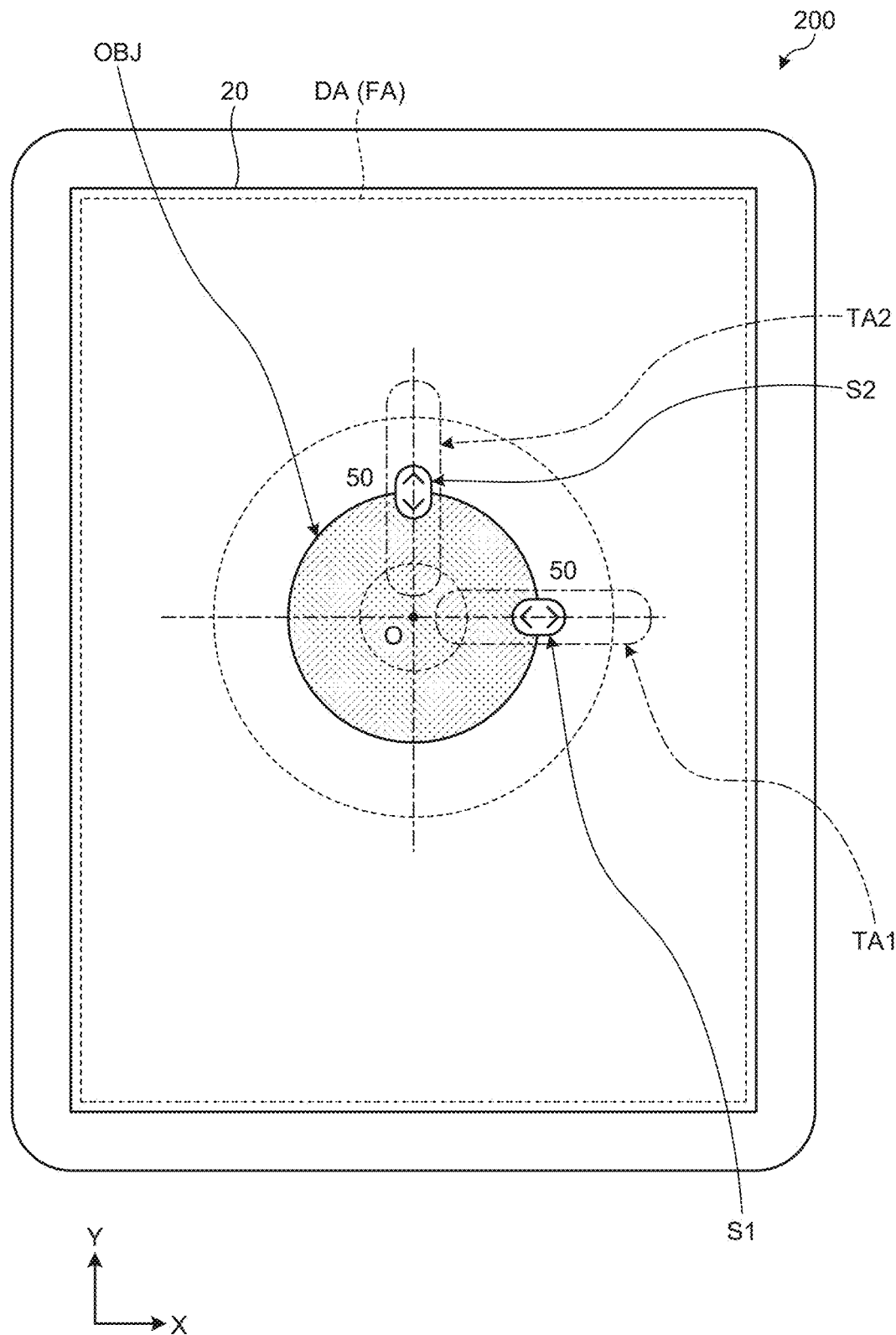
FIG. 15A is a conceptual diagram illustrating an example of the display aspect of a light diffusion degree setting screen on the control device according to the first embodiment.
Figure 15B:
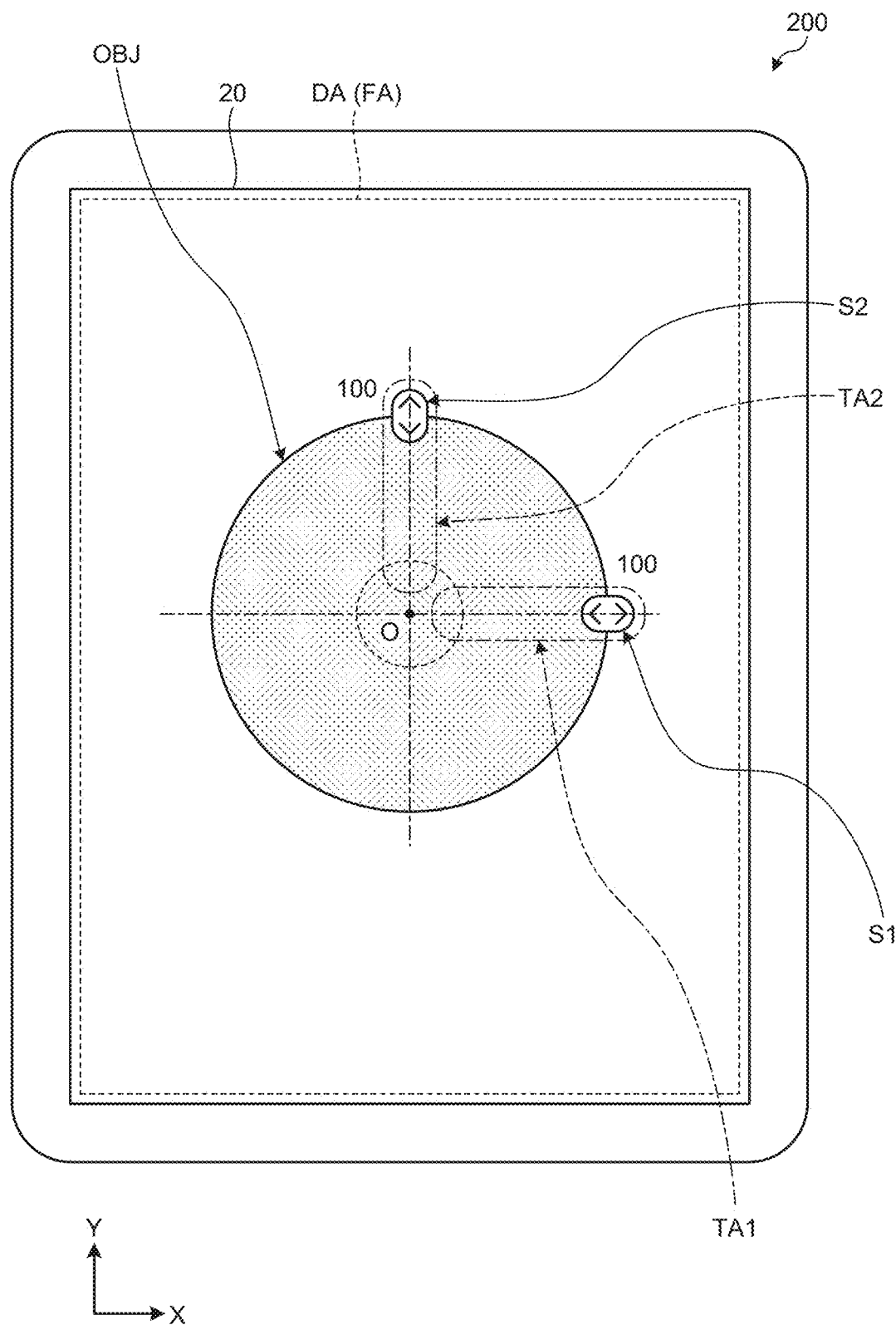
FIG. 15B is a conceptual diagram illustrating an example of the display aspect of the light diffusion degree setting screen on the control device according to the first embodiment.
Figure 15C:
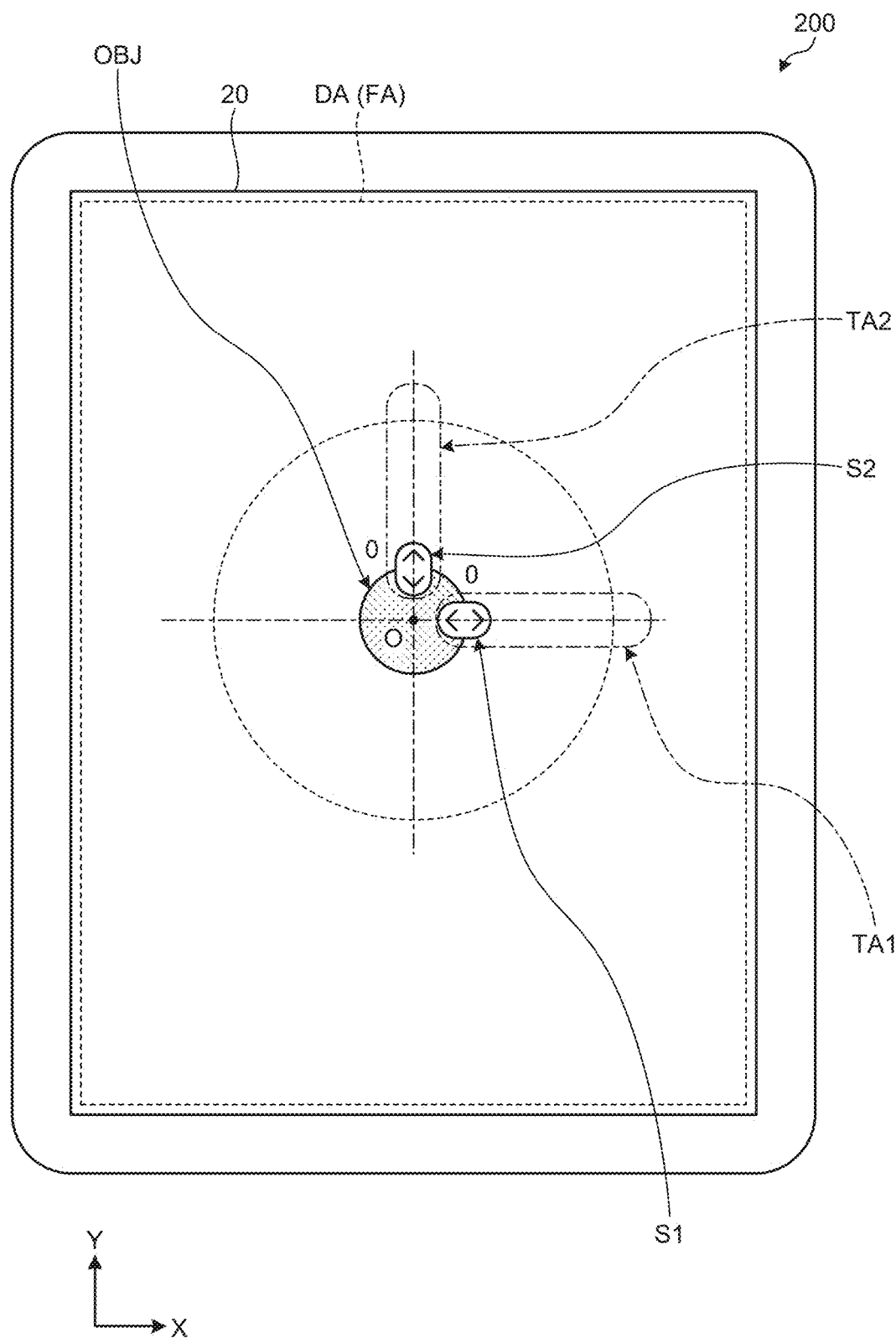
FIG. 15C is a conceptual diagram illustrating an example of the display aspect of the light diffusion degree setting screen on the control device according to the first embodiment.
Figure 15D:
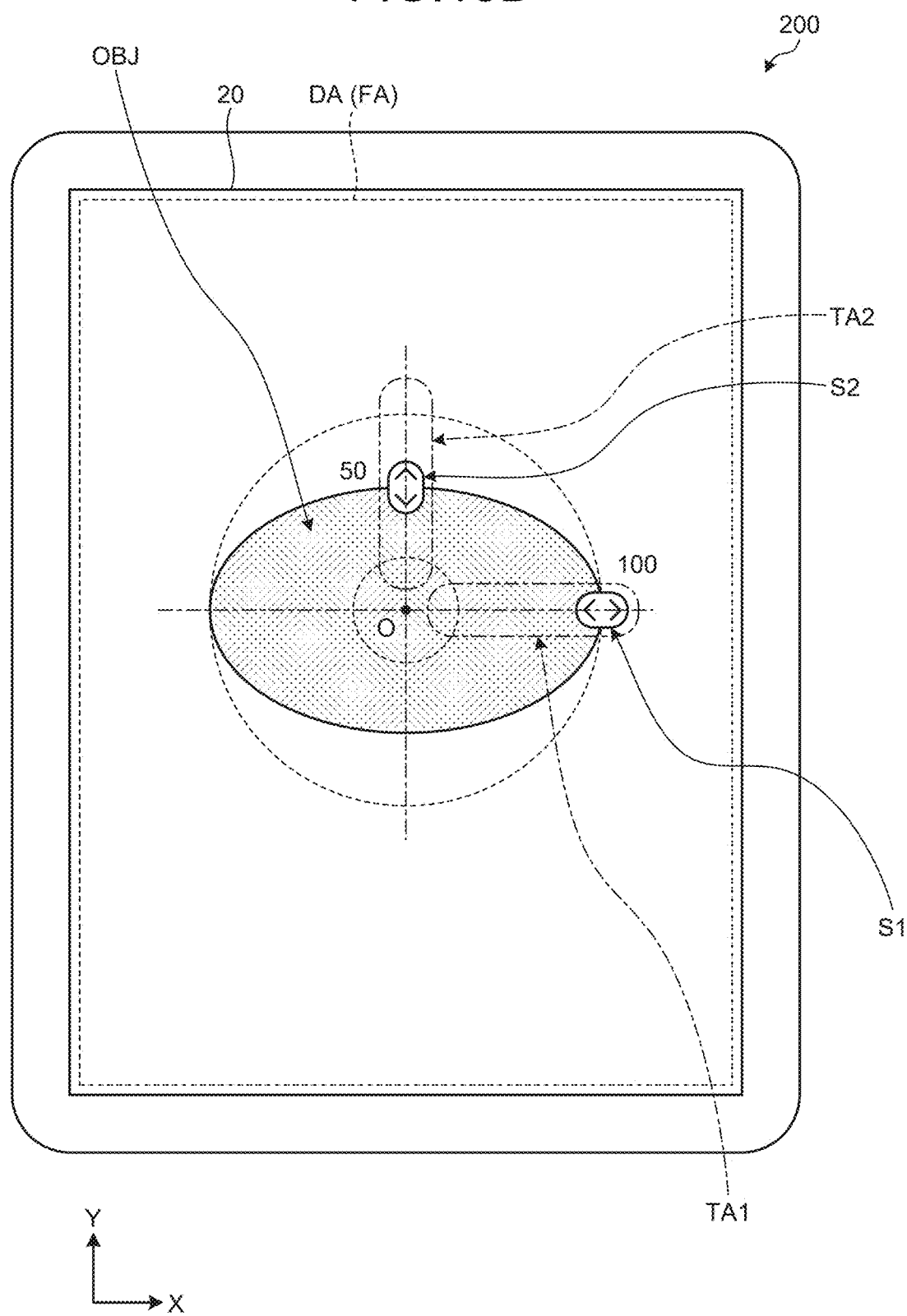
FIG. 15D is a conceptual diagram illustrating an example of the display aspect of the light diffusion degree setting screen on the control device according to the first embodiment.

FIG. 15A illustrates an example in which a Dx-direction light diffusion degree Sx of the illumination device 1 is 50% and a Dy-direction light diffusion degree Sy thereof is 50%. As illustrated in FIG. 15A, the values of the Dx-direction light diffusion degree Sx and the Dy-direction light diffusion degree Sy are displayed on the display screen as well. In the following description, the Dx-direction light diffusion degree Sx is referred to as a horizontal diffusion degree Sx, and the Dy-direction light diffusion degree Sy is referred to as a vertical diffusion degree Sy. FIG. 15B illustrates an example in which the horizontal diffusion degree Sx of the illumination device 1 is 100% and the vertical diffusion degree Sy thereof is 100%. FIG. 15C illustrates an example in which the horizontal diffusion degree Sx of the illumination device 1 is 0% and the vertical diffusion degree Sy thereof is 0%. FIG. 15D illustrates an example in which the horizontal diffusion degree Sx of the illumination device 1 is 100% and the vertical diffusion degree Sy thereof is 50%.

In the present disclosure, the shape of the light distribution shape object OBJ on the light diffusion degree setting screen changes in a circular or elliptical shape along with movement of the first slider S1 and the second slider S2 as illustrated in FIGS. 15A, 15B, 15C, and 15D.

As illustrated in FIG. 9, in the illumination device 1 as a control target in the present disclosure, a predetermined substantially circular area (outline "d") is irradiated with light even in a case where the horizontal diffusion degree Sx and vertical diffusion degree Sy of the illumination device 1 are both 0%. In the present disclosure, as illustrated in FIG. 15C, the light distribution shape object OBJ in a small circular shape is displayed in a case where the horizontal diffusion degree Sx and the vertical diffusion degree Sy are both 0%.

Since the irradiation area of actual light from the illumination device 1 is present even in a case where the horizontal diffusion degree Sx and the vertical diffusion degree Sy are both 0%, the irradiation area of actual light can be intuitively understood.

In the present disclosure, as illustrated in FIGS. 15A, 15B, 15C, and 15D, a first region TA1 is provided as a region in which the first slider S1 can be operated.

The first slider S1 can be moved in the X direction in the first region TA1 between the position on the outline of the light distribution shape object OBJ in a case where the horizontal diffusion degree Sx is 0% and the position on the outline of the light distribution shape object OBJ in a case where the horizontal diffusion degree Sx is 100%. Thus, the first slider S1 does not move when the user's finger moves away from the screen or even when it remains on the screen but moves out of the first region TA1.

In the present disclosure, as illustrated in FIGS. 15A, 15B, 15C, and 15D, a second region TA2 is provided as a region in which the second slider S2 can be operated.

The second slider S2 can be moved in the Y direction in the second region TA2 between the position on the outline of the light distribution shape object OBJ in a case where the vertical diffusion degree Sy is 0% and the position on the outline of the light distribution shape object OBJ in a case where the vertical diffusion degree Sy is 100%. Thus, the second slider S2 does not move when the user's finger moves away from the screen or even when it remains on the screen but moves out of the second region TA2.

Figure 16:
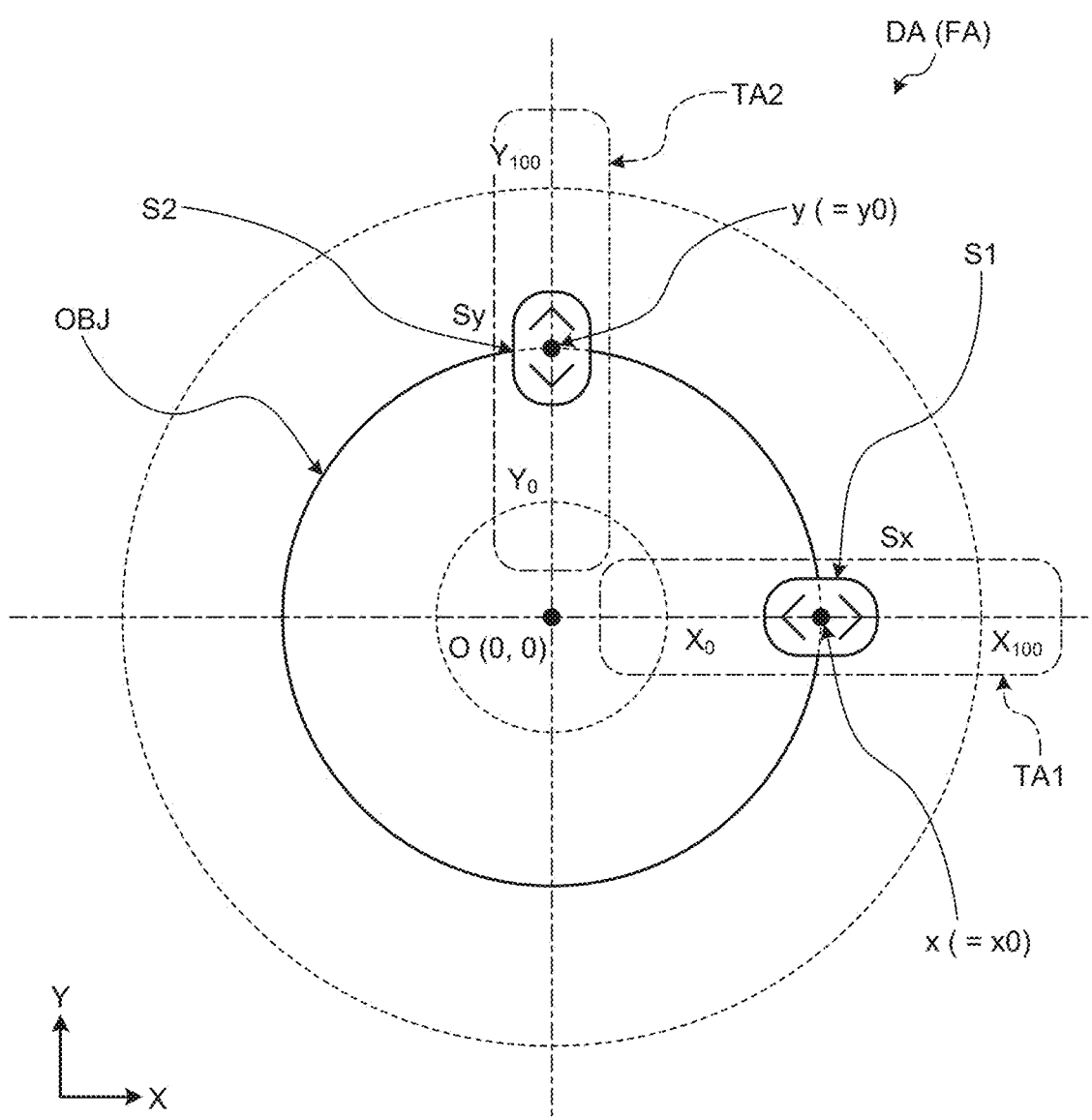
FIG. 16 is a diagram for description of the relation between the position on the light diffusion degree setting screen on the control device according to the first embodiment and the light diffusion degree.

FIG. 16 is a diagram for description of the relation between the position on the light diffusion degree setting screen of the control device 200 according to the first embodiment and the light diffusion degree. In the present disclosure, to facilitate description, the position (coordinate) on the display region DA of the display panel 20 and the position (coordinate) on the detection region FA of the touch sensor 30 are assumed to be equivalent.

On the light diffusion degree setting screen of the control device 200 according to the first embodiment, the horizontal diffusion degree Sx of the illumination device 1 can be set based on the movement amount of a position x of an intersection point of the X axis of the XY plane and the outline of the light distribution shape object OBJ.

In the present disclosure, the position x of the intersection point of the X axis and the outline of the light distribution shape object OBJ is the central point of the first slider S1. In other words, a position x0 of the first slider S1 on the display region DA coincides with the position x of the intersection point of the X axis and the outline of the light distribution shape object OBJ. Accordingly, the horizontal diffusion degree Sx of the illumination device 1 can be set by touching the first slider S1 and moving the first slider S1 in the X-axis direction. In FIG. 16, "Sx" indicates the horizontal diffusion degree (for example, 50%) of the illumination device 1.

The reference movement amount Px in the X direction on the XY plane in a case where a horizontal diffusion degree change amount ΔSx of the illumination device 1 is 1% is expressed by Expression (1) below, where $X_{100}$ represents the intersection point of the X axis and the outline of the light distribution shape object OBJ in a case where the horizontal diffusion degree Sx is 100%, and $X_0$ represents the intersection point of the X axis and the outline of the light distribution shape object OBJ in a case where the horizontal diffusion degree Sx is 0%.

$$Px = (X_{100} - X_0)/100 \quad (1)$$

The relation between the horizontal diffusion degree Sx and the position x0 of the first slider S1 on the display region DA on the XY plane is expressed by Expressions (2) and (3) below by using Expression (1) above.

$$Sx = (x0 - X_0)/Px \quad (2)$$
$$x0 = Sx + Px + X_0 \quad (3)$$

The vertical diffusion degree Sy of the illumination device 1 on the light diffusion degree setting screen of the control device 200 according to the first embodiment can be set based on the movement amount of a position y of an intersection point of the Y axis of the XY plane and the outline of the light distribution shape object OBJ.

In the present disclosure, the position y of the intersection point of the Y axis and the outline of the light distribution shape object OBJ is the central point of the second slider S2. In other words, a position y0 of the second slider S2 on the display region DA coincides with the position y of the intersection point of the Y axis and the outline of the light distribution shape object OBJ. Accordingly, the vertical diffusion degree Sy of the illumination device 1 can be set by touching the second slider S2 and moving the second slider S2 in the Y-axis direction. In FIG. 16, "Sy" indicates the vertical diffusion degree (for example, 50%) of the illumination device 1.

The reference movement amount Py in the Y direction on the XY plane in a case where a vertical diffusion degree change amount ΔSy of the illumination device 1 is 1% is expressed by Expression (4) below, where $Y_{100}$ represents the intersection point of the Y axis and the outline of the light distribution shape object OBJ in a case where the vertical diffusion degree Sy is 100%, and $Y_0$ represents the intersection point of the Y axis and the outline of the light distribution shape object OBJ in a case where the vertical diffusion degree Sy is 0%.

$$Py = (Y_{100} - Y_0)/100 \quad (4)$$

The relation between the vertical diffusion degree Sy and the position y0 of the second slider S2 on the display region DA on the XY plane is expressed by Expressions (5) and (6) below by using Expression (4) above.

$$Sy = (y0 - Y_0)/Py \quad (5)$$

$$y0 = Sy \times Py + Y_0 \quad (6)$$

The above description is made on the aspect in which the light distribution shape object OBJ in a circular shape is displayed in a case where the horizontal diffusion degree Sx and the vertical diffusion degree Sy are both 0%, but the configuration is not limited thereto. For example, the origin O(0, 0) of the XY plane on the light diffusion degree setting screen may be a position in a case where the horizontal diffusion degree Sx and the vertical diffusion degree Sy are both 0%.

The following describes the light diffusion degree setting processing by the control device 200 for the illumination device 1 according to the first embodiment described above, and the illumination device 1 of the illumination system.

Figure 17:
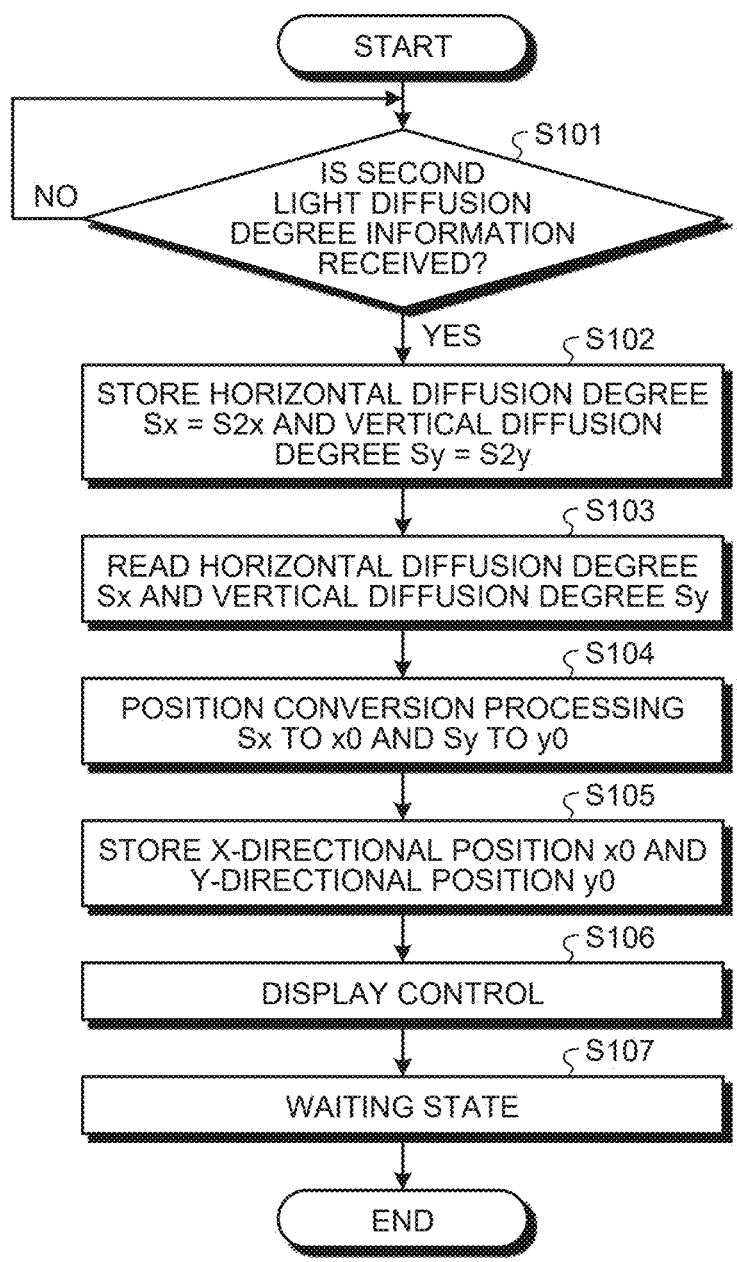
FIG. 17 is a flowchart illustrating an example of initial setting of the light diffusion degree setting screen on a control device for the illumination device according to the first embodiment.
Figure 18:
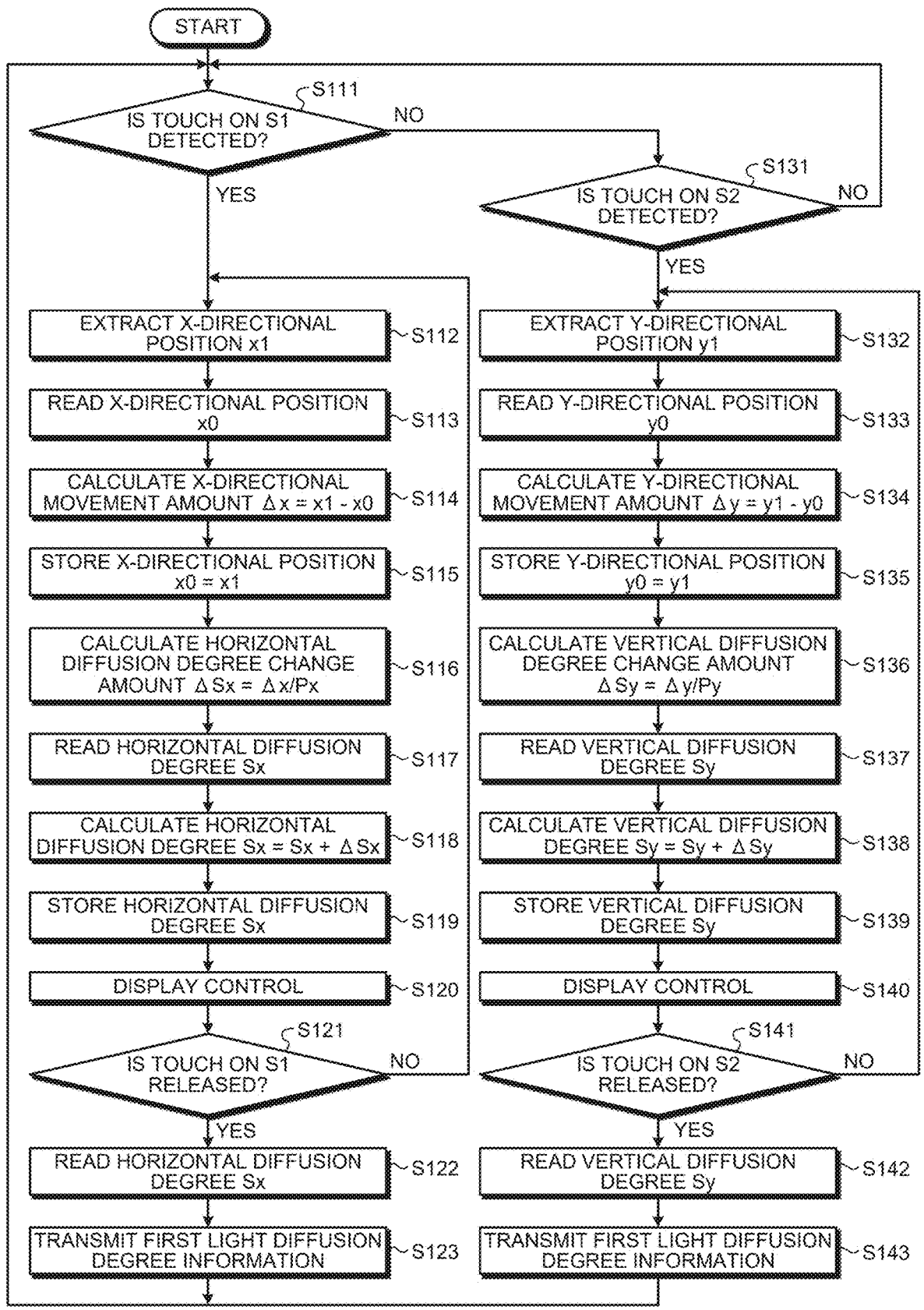
FIG. 18 is a flowchart illustrating an example of light diffusion degree setting processing by the control device for the illumination device according to the first embodiment.

FIG. 17 is a flowchart illustrating an example of initial setting of the light diffusion degree setting screen of the control device 200 for the illumination device 1 according to the first embodiment. FIG. 18 is a flowchart illustrating an example of the light diffusion degree setting processing by the control device 200 for the illumination device 1 according to the first embodiment.

First, the control device 200 executes initial setting of the light diffusion degree setting screen illustrated in FIG. 17.

The control device 200 transmits a request command for the second light diffusion degree information to the illumination device 1 that are already turned on. The transmission-reception circuit 111 of the illumination device 1 reads the second light diffusion degree information stored in the storage circuit 113 and transmits the second light diffusion degree information to the control device 200. The electrode drive circuit 112 of the illumination device 1 supplies drive voltage in accordance with the second light diffusion degree information stored in the storage circuit 113 to the drive electrodes 10 and 13 of each liquid crystal cell 2 of the optical element 100.

The control device 200 determines whether the second light diffusion degree information is received from the illumination device 1 (step S101). If the second light diffusion degree information is not received (No at step S101), the control device 200 repeatedly executes the processing at step S101.

If the second light diffusion degree information is received from the illumination device 1 (Yes at step S101), the transmission-reception circuit 225 of the control device 200 stores, in the storage circuit 223, the Dx-direction light diffusion degree S2x in the second light diffusion degree information as the horizontal diffusion degree Sx, and the Dy-direction light diffusion degree S2y therein as the vertical diffusion degree Sy (step S102).

The position conversion circuit 224 of the control device 200 reads the horizontal diffusion degree Sx and the vertical diffusion degree Sy stored in the storage circuit 223 (step S103), converts the horizontal diffusion degree Sx into the X-directional position x0 of the first slider S1 on the display region DA on the light diffusion degree setting screen, converts the vertical diffusion degree Sy into the Y-directional position y0 of the second slider S2 on the display region DA on the light diffusion degree setting screen by using Expressions (3) and (6) above (step S104), and stores the X-directional position x0 and the Y-directional position y0 in the storage circuit 223 (step S105).

Then, the display control circuit 231 reads, from the storage circuit 223, the horizontal diffusion degree Sx, the X-directional position x0, the vertical diffusion degree Sy, and the Y-directional position y0, which are obtained through the above-described processing at steps S101 to S105, executes display control of the display panel 20 such that the read information is reflected in the shape of the light distribution shape object OBJ, the display of the horizontal diffusion degree Sx, the position of the first slider S1, the display of the vertical diffusion degree Sy, and the position of the second slider S2 (step S106), and transitions to a waiting state for the light diffusion degree setting processing illustrated in FIG. 18 (step S107).

In the first embodiment, description will be made on an example in which the light diffusion degree setting processing illustrated in FIG. 18 is executed after transition to the waiting state for the light diffusion degree setting processing in initial setting of the light diffusion degree setting screen illustrated in FIG. 17.

In the waiting state for the light diffusion degree setting processing, the control device 200 executes touch detection processing of the first slider S1 (step S111) and touch detection processing of the second slider S2 (step S131). Specifically, when the first slider S1 is touched (Yes at step S111), transition to step S112 is made. When the first slider S1 is not touched (No at step S111), transition to step S131 is made. When the second slider S2 is touched (Yes at step S131), transition to step S132 is made. When the second slider S2 is not touched (No at step S131), a return to step S111 is made.

If the first slider S1 is touched and moved in the first region TA1 (Yes at step S111), the position extraction circuit 212 extracts an X-directional position x1 of the first slider S1 after the movement (step S112).

The movement amount calculation circuit 221 reads the position x0 stored in the storage circuit 223 (step S113) and calculates an X-directional movement amount Δx(=x1−x0) of the first slider S1 (step S114). The position extraction circuit 212 updates the extracted X-directional position x1 on the detection region FA as the new X-directional position x0 and stores the new X-directional position x0 in the storage circuit 223 (step S115).

The light diffusion degree calculation circuit 222 calculates the horizontal diffusion degree change amount ΔSx by dividing the X-directional movement amount Δx calculated by the movement amount calculation circuit 221 by the reference movement amount Px (step S116). The light diffusion degree calculation circuit 222 reads the horizontal diffusion degree Sx before the movement of the first slider S1, which is stored in the storage circuit 223 (step S117), calculates the horizontal diffusion degree Sx after the movement of the first slider (=Sx+ΔSx) (step S118), and stores the horizontal diffusion degree Sx after the movement of the first slider in the storage circuit 223 (step S119).

Then, the display control circuit 231 reads, from the storage circuit 223, the horizontal diffusion degree Sx and the X-directional position x0 calculated through the above-described processing at steps S112 to S119 and executes display control of the display panel 20 such that the read information is reflected in the shape of the light distribution shape object OBJ, the position of the first slider S1, and the display of the horizontal diffusion degree Sx (step S120).

The detection circuit 211 detects whether the touch state on the first slider S1 is released (step S121). If the touch state on the first slider S1 is continuous (No at step S121), the processing at steps S112 to S121 is repeatedly executed. Accordingly, while the touch state on the first slider S1 is continuous, the shape of the light distribution shape object OBJ, the position of the first slider S1, and the display of the horizontal diffusion degree Sx change in real time in response to movement of the first slider S1. Specifically, the operation at steps S112 to S121 is performed in an extremely short time, for example, in the period of 30 Hz to 120 Hz in synchronization with the period of touch detection. Accordingly, the user moves the first slider S1 at step S112 and this action is immediately reflected onto the display screen through step S120 so that the user can recognize that his or her action and change of the screen display are being integrally performed. This effect is the same in the case of control of the vertical diffusion below.

If the touch state on the first slider S1 is released (Yes at step S121), the transmission-reception circuit 225 reads the horizontal diffusion degree Sx stored in the storage circuit 223 (step S122), sets the read horizontal diffusion degree Sx as the Dx-direction light diffusion degree S1$x$, and transmits the first light diffusion degree information to the illumination device 1 (step S123), and a return to the processing at step S111 is made.

In the present disclosure, the state in which the touch state on the first slider S1 is released (Yes at step S121) includes a state in which drag operation of the first slider S1 is released, for example, when the user's finger moves away from the first slider S1 or when the touch detection position moves out of the first region TA1.

The electrode drive circuit 112 of the illumination device 1 stores the first light diffusion degree information (Dx-direction light diffusion degree S1$x$) received from the control device 200 in the storage circuit 113 as the second light diffusion degree information and supplies drive voltage to the drive electrodes 10 and 13 of each liquid crystal cell 2 of the optical element 100 based on the second light diffusion degree information. Thus, the horizontal diffusion degree Sx set on the light diffusion degree setting screen of the control device 200 is reflected onto light diffusion degree control (horizontal diffusion) of the illumination device 1.

If the second slider S2 is touched (Yes at step S131), the position extraction circuit 212 extracts a Y-directional position y1 of the second slider S2 on the detection region FA (step S132).

The movement amount calculation circuit 221 reads the position y0 stored in the storage circuit 223 (step S133) and calculates a Y-directional movement amount $\Delta y(=y1-y0)$ of the second slider S2 (step S134). Then, the position extraction circuit 212 stores the extracted Y-directional position y1 on the detection region FA in the storage circuit 223 as the Y-directional position y0 on the display region DA (step S135).

The light diffusion degree calculation circuit 222 calculates the vertical diffusion degree change amount $\Delta Sy$ by dividing the Y-directional movement amount $\Delta y$ calculated by the movement amount calculation circuit 221 by the reference movement amount Py (step S136). The light diffusion degree calculation circuit 222 reads the vertical diffusion degree Sy before the movement of the second slider, which is stored in the storage circuit 223 (step S137), calculates the vertical diffusion degree Sy after the movement of the second slider (=Sy+$\Delta Sy$) (step S138), and stores the vertical diffusion degree Sy after the movement of the second slider in the storage circuit 223 (step S139).

Then, the display control circuit 231 reads, from the storage circuit 223, the vertical diffusion degree Sy and the Y-directional position y0 calculated through the above-described processing at steps S132 to S139 and executes display control of the display panel 20 such that the read information is reflected in the shape of the light distribution shape object OBJ, the position of the second slider S2, and the display of the vertical diffusion degree Sy (step S140).

The detection circuit 211 detects whether the touch state on the second slider S2 is released (step S141). If the touch state on the second slider S2 is continuous (No at step S141), the processing at steps S132 to S141 is repeatedly executed. Thus, while the touch state on the second slider S2 is continuous, the shape of the light distribution shape object OBJ, the position of the second slider S2, and the display of the vertical diffusion degree Sy change in real time in response to movement of the second slider S2.

If the touch state on the second slider S2 is released (Yes at step S141), the transmission-reception circuit 225 reads the vertical diffusion degree Sy stored in the storage circuit 223 (step S142), sets the read vertical diffusion degree Sy as the Dy-direction light diffusion degree S1$y$, and transmits the first light diffusion degree information to the illumination device 1 (step S143), and a return to the processing at step S111 is made.

In the present disclosure, the state in which the touch state on the second slider S2 is released (Yes at step S141) includes a state in which drag operation of the second slider S2 is released, for example, when the user's finger moves away from the second slider S2 or when the touch detection position moves out of the second region TA2.

The electrode drive circuit 112 of the illumination device 1 stores the first light diffusion degree information (Dy-direction light diffusion degree S1$y$) received from the control device 200 in the storage circuit 113 as the second light diffusion degree information and supplies drive voltage to the drive electrodes 10 and 13 of each liquid crystal cell 2 of the optical element 100 based on the second light diffusion degree information. Thus, the vertical diffusion degree Sy set on the light diffusion degree setting screen of the control device 200 is reflected onto light diffusion degree control (vertical diffusion) of the illumination device 1.

In the above-described light diffusion degree setting processing according to the first embodiment, the shape of the light distribution shape object OBJ, the position of the first slider S1, and the display of the horizontal diffusion degree Sx change in real time in response to movement of the first slider S1 while a touch on the first slider S1 is continuous. However, actual light distribution control of the illumination device 1 is executed after a touch on the first slider S1 or the second slider S2 is released. Specifically, while the first slider S1 is touched and moved to right and left on the screen, the shape of the light distribution shape object OBJ on the screen changes but the actual light distribution state of the illumination device 1 does not change. The actual change of the light distribution state of the illumination device 1 is made after a touch on each slider is released or when the touch position moves out of the first region TA1 or the second region TA2. Thus, after the light diffusion degree of the illumination device 1 in the Dx direction or the Dy direction is set on the light diffusion degree setting screen of the control device 200, the set light diffusion degree is reflected onto light distribution control of the illumination device.

Modification

Figure 19:
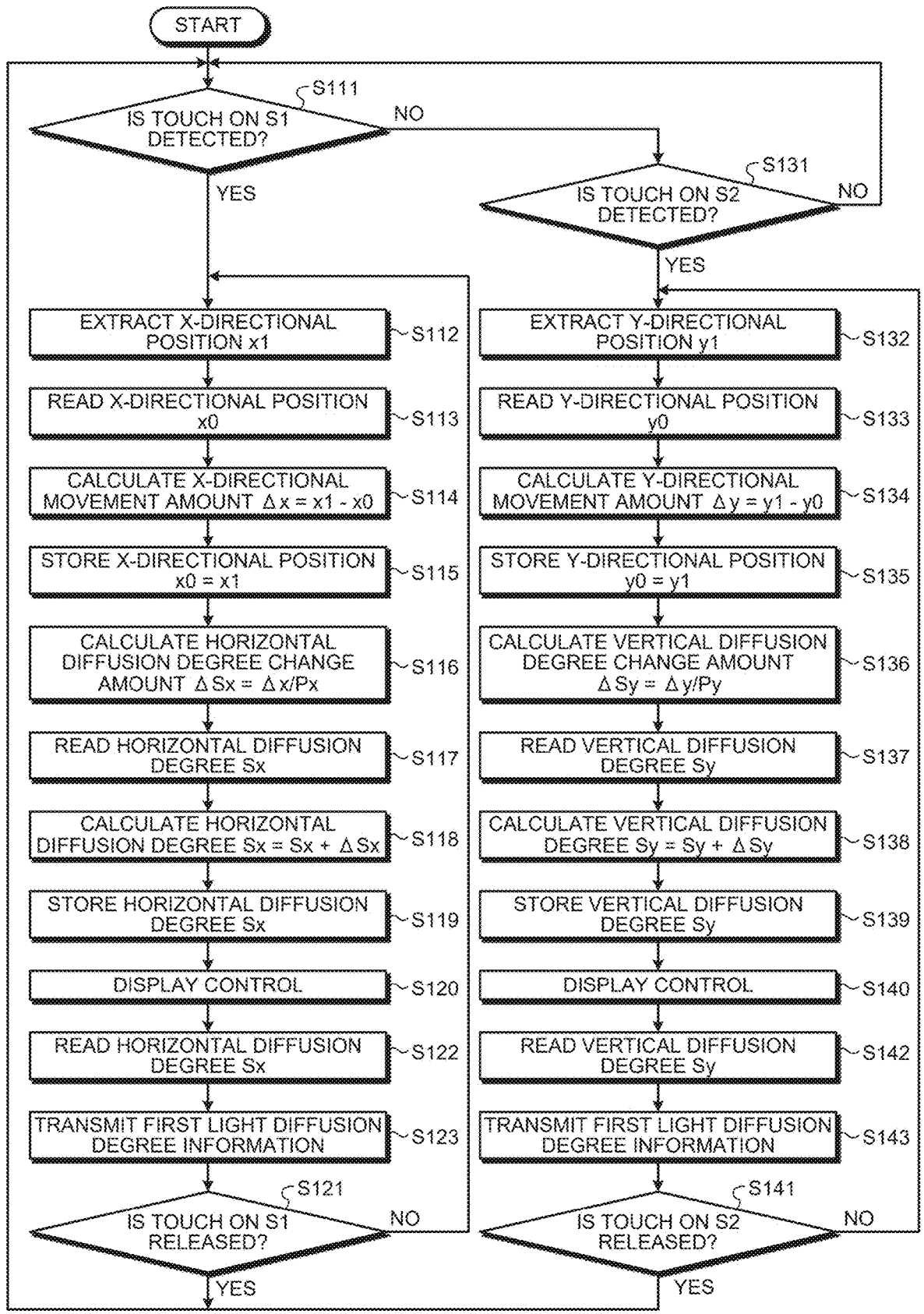
FIG. 19 is a flowchart illustrating an example of light diffusion degree setting processing by a control device for an illumination device according to a modification of the first embodiment.

FIG. 19 is a flowchart illustrating an example of the light diffusion degree setting processing by the control device 200 for the illumination device 1 according to a modification of the first embodiment. In the following, points different from the flowchart illustrated in FIG. 18 will be described in detail, and duplicate description is omitted.

In the light diffusion degree setting processing by the control device for the illumination device according to the modification of the first embodiment illustrated in FIG. 19, right after display control of the display panel 20 is executed at step S120, the transmission-reception circuit 225 reads the horizontal diffusion degree Sx stored in the storage circuit 223 (step S122), sets the read horizontal diffusion degree Sx as the Dx-direction light diffusion degree S1x, and transmits the first light diffusion degree information to the illumination device 1 (step S123).

The electrode drive circuit 112 of the illumination device 1 stores the first light diffusion degree information (Dx-direction light diffusion degree S1x) received from the control device 200 in the storage circuit 113 as the second light diffusion degree information and supplies drive voltage to the drive electrodes 10 and 13 of each liquid crystal cell 2 of the optical element 100 based on the second light diffusion degree information.

Then, the detection circuit 211 detects whether the touch state on the first slider S1 is released (step S121). If the touch state on the first slider S1 is released (Yes at step S121), a return to the processing at step S111 is made.

If the touch state on the first slider S1 is continuous (No at step S121), the processing at steps S112 to S123 is repeatedly executed. Thus, while the touch state on the first slider S1 is continuous, the shape of the light distribution shape object OBJ, the position of the first slider S1, and the display of the horizontal diffusion degree Sx change in real time in response to movement of the first slider S1. In addition, the light distribution state of the illumination device 1 changes in real time in response to movement of the first slider S1 on the light diffusion degree setting screen of the control device 200.

In the light diffusion degree setting processing by the control device for the illumination device according to the modification of the first embodiment illustrated in FIG. 19, right after display control of the display panel 20 is executed at step S140, the transmission-reception circuit 225 reads the vertical diffusion degree Sy stored in the storage circuit 223 (step S142), sets the read vertical diffusion degree Sy as the Dy-direction light diffusion degree S1y, and transmits the first light diffusion degree information to the illumination device 1 (step S143).

The electrode drive circuit 112 of the illumination device 1 stores the first light diffusion degree information (Dy-direction light diffusion degree S1y) received from the control device 200 in the storage circuit 113 as the second light diffusion degree information and supplies drive voltage to the drive electrodes 10 and 13 of each liquid crystal cell 2 of the optical element 100 based on the second light diffusion degree information.

Then, the detection circuit 211 detects whether the touch state on the second slider S2 is released (step S141). If the touch state on the second slider S2 is released (Yes at step S141), a return to the processing at step S111 is made.

If the touch state on the second slider S2 is continuous (No at step S141), the processing at steps S132 to S143 is repeatedly executed. Thus, while the touch state on the second slider S2 is continuous, the shape of the light distribution shape object OBJ, the position of the second slider S2, and the display of the vertical diffusion degree Sy change in real time in response to movement of the second slider S2. In addition, the vertical diffusion degree Sy is reflected onto light diffusion degree control of the illumination device 1 in real time in response to movement of the second slider S2 on the light diffusion degree setting screen of the control device 200.

In the above-described light diffusion degree setting processing according to the modification of the first embodiment, not only the shape of the light distribution shape object OBJ but also alignment control of the illumination device change in real time in response to movement of the first slider S1 on the light diffusion degree setting screen of the control device 200. Thus, the light diffusion degree of the illumination device 1 in the Dx direction and the Dy direction can be set more intuitively than with the light diffusion degree setting processing according to the first embodiment.

Second Embodiment

Figure 20:
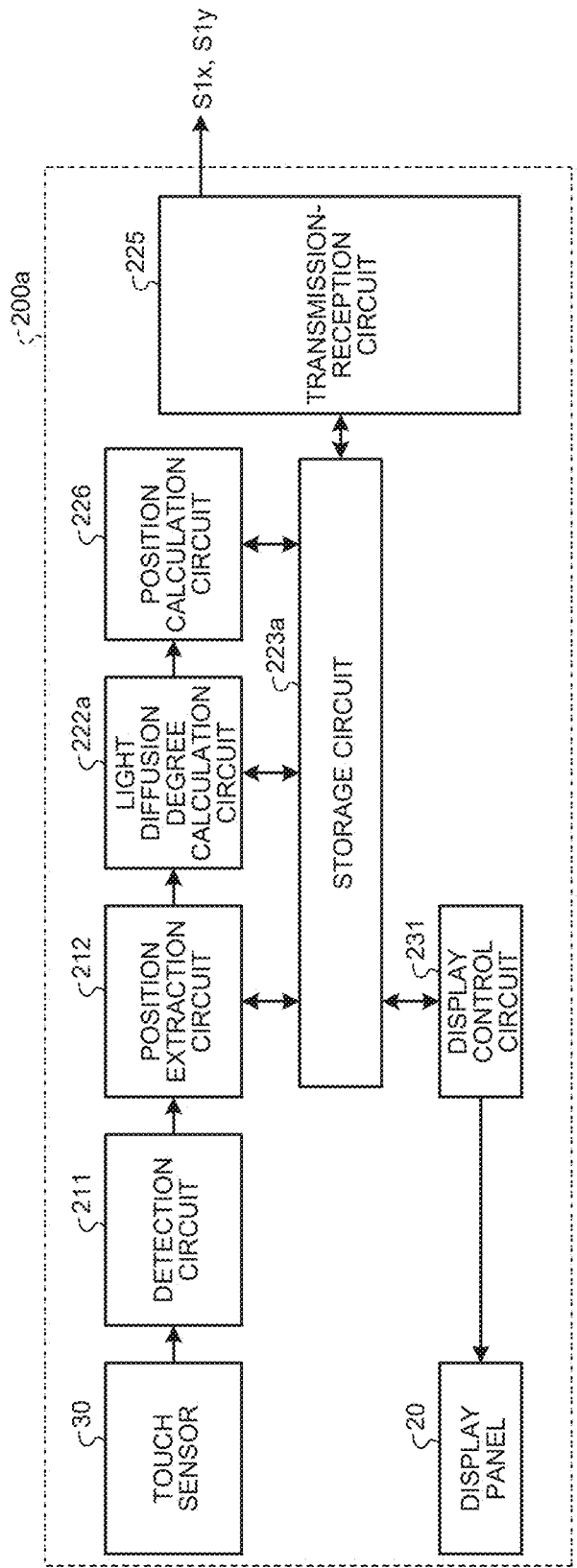
FIG. 20 is a diagram illustrating an example of the control block configuration of a control device according to a second embodiment.

FIG. 20 is a diagram illustrating an example of the control block configuration of a control device 200a according to a second embodiment. In the second embodiment, a control block configuration for executing light diffusion degree fine adjustment processing to be described later will be described below. The same components as those in the first embodiment are denoted by the same reference signs, and duplicate description with the first embodiment is omitted in some cases.

As illustrated in FIG. 20, the control device 200a according to the second embodiment includes the display panel 20, the touch sensor 30, the detection circuit 211, the position extraction circuit 212, a light diffusion degree calculation circuit 222a, a storage circuit 223a, the transmission-reception circuit 225, a position calculation circuit 226, and the display control circuit 231.

The light diffusion degree calculation circuit 222a calculates the light diffusion degree of the illumination device 1 as a control target by adding a fine adjustment amount defined for an object extracted by the position extraction circuit 212. The light diffusion degree calculation circuit 222a is a component configured by, for example, a CPU of a smartphone, a tablet, or the like constituting the control device 200a. The light diffusion degree calculation circuit 222a may be a component substantially identical to the light diffusion degree calculation circuit 222 of the control device 200 according to the first embodiment.

The storage circuit 223a is composed of, for example, a RAM, an EEPROM, or a ROM of the smartphone, the tablet, or the like constituting the control device 200a. In the present embodiment, the storage circuit 223a stores, in addition to the reference movement amount Px in the X direction and the reference movement amount Py in the Y direction, fine adjustment amounts $\Delta Sxf(+)$ and $\Delta Sxf(-)$ and fine adjustment amounts $\Delta Syf(+)$ and $\Delta Syf(-)$ used in the light diffusion degree fine adjustment processing to be described later. The storage circuit 223a temporarily stores, for example, intermediate data in the light diffusion degree fine adjustment processing to be described later. The storage circuit 223a may be a component substantially identical to the storage circuit 223 of the control device 200 according to the first embodiment.

The position calculation circuit 226 calculates the X-directional position x0 of the first slider S1 on the display region DA and the Y-directional position y0 of the second slider S2 on the display region DA on the light diffusion degree setting screen, which correspond to the light diffusion degree calculated by the light diffusion degree calculation circuit 222a. The position calculation circuit 226 is a component configured by, for example, the CPU of the smartphone, the tablet, or the like constituting the control device 200a.

Figure 21A:
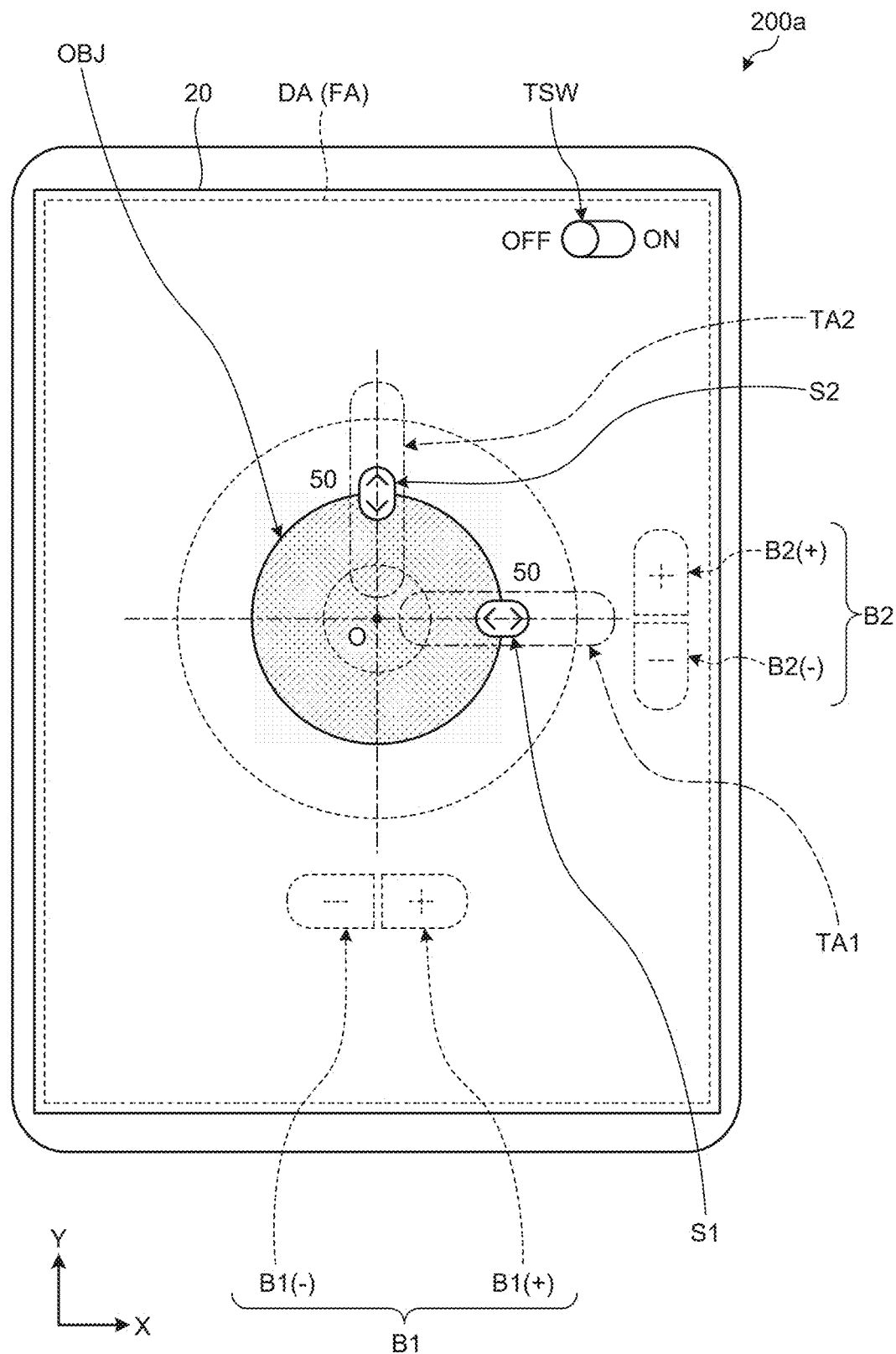
FIG. 21A is a conceptual diagram illustrating an example of the display aspect of a light diffusion degree setting screen on the control device according to the second embodiment.
Figure 21B:
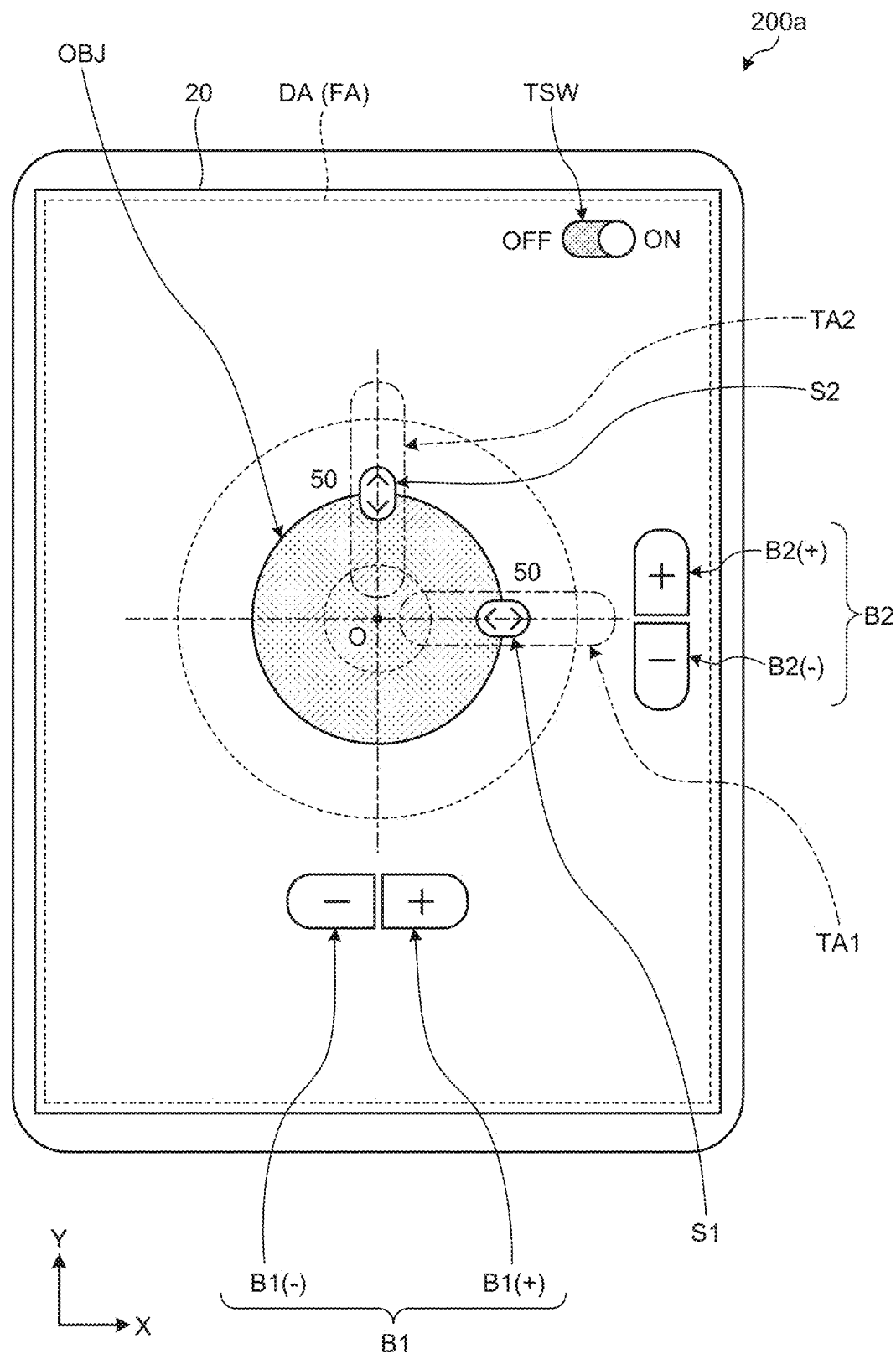
FIG. 21B is a conceptual diagram illustrating an example of the display aspect of the light diffusion degree setting screen on the control device according to the second embodiment.

FIGS. 21A and 21B are conceptual diagrams illustrating an example of the display aspect of the light diffusion degree setting screen of the control device 200a according to the second embodiment.

The display panel 20 is provided with the display region DA overlapping the detection region FA of the touch sensor 30 in a plan view. In the example illustrated in FIGS. 21A and 21B, as in the first embodiment, the light distribution shape object OBJ with a central point at the origin O(0, 0) of the XY plane on the light diffusion degree setting screen is displayed, and the first slider S1 and the second slider S2 for setting the light diffusion degree of the illumination device 1 are disposed on the outline of the light distribution shape object OBJ.

In the display aspect of the light diffusion degree setting screen of the control device 200a according to the second embodiment, a toggle switch (fine adjustment switching object) TSW for selecting whether the light diffusion degree fine adjustment processing is enabled (ON) or disabled (OFF), a first fine adjustment button (first fine adjustment object) B1 for finely adjusting the light diffusion degree of the illumination device 1 in the Dx direction (first direction), and a second fine adjustment button (second fine adjustment object) B2 for finely adjusting the light diffusion degree of the illumination device 1 in the Dy direction (second direction) are provided in addition to the display aspect of the first embodiment illustrated in FIGS. 15A, 15B, 15C, and 15D.

As illustrated in FIGS. 21A and 21B, the first fine adjustment button B1 includes a first fine adjustment button (positive-side first fine adjustment object) B1(+) for fine adjustment on the positive side in the Dx direction and a first fine adjustment button (negative-side first fine adjustment object) B1(-) for fine adjustment on the negative side.

As illustrated in FIGS. 21A and 21B, the second fine adjustment button B2 includes a second fine adjustment button (positive-side second fine adjustment object) B2(+) for fine adjustment on the positive side in the Dy direction and a second fine adjustment button (negative-side second fine adjustment object) B2(-) for fine adjustment on the negative side.

The toggle switch TSW is, for example, a button (pictorial image) displayed as an icon with which whether the light diffusion degree fine adjustment processing is enabled (ON) or disabled (OFF) can be selected by touching and moving the toggle switch TSW displayed on the display region DA to right and left.

In the example illustrated in FIGS. 21A and 21B, the toggle switch TSW is displayed at the upper-right corner of the light diffusion degree setting screen.

The first fine adjustment button B1(+), the first fine adjustment button B1(-), the second fine adjustment button B2(+), and the second fine adjustment button B2(-) are hidden as illustrated in FIG. 21A when the light diffusion degree fine adjustment processing is disabled (OFF).

The first fine adjustment button B1(+), the first fine adjustment button B1(-), the second fine adjustment button B2(+), and the second fine adjustment button B2(-) are displayed as illustrated in FIG. 21B when the light diffusion degree fine adjustment processing is enabled (ON).

The fine adjustment amount (first-direction light diffusion degree fine adjustment amount) $\Delta Sxf(+)$ by which the horizontal diffusion degree Sx increases in the Dx direction (first direction) is defined for the first fine adjustment button B1(+). The fine adjustment amount $\Delta Sxf(+)$ is set as, for example, the minimum value (for example, +1%) of the amount of change in the "+" direction in the light diffusion degree setting processing. The first fine adjustment button B1(+) is, for example, a button (pictorial image) displayed as an icon with which the horizontal diffusion degree fine adjustment amount $\Delta Sxf(+)$ to be added to the horizontal diffusion degree Sx can be selected by touching the first fine adjustment button B1(+) displayed on the display region DA.

The fine adjustment amount (first-direction light diffusion degree fine adjustment amount) $\Delta Sxf(-)$ by which the horizontal diffusion degree Sx decreases in the Dx direction (first direction) is defined for the first fine adjustment button B1(-). The horizontal diffusion degree fine adjustment amount $\Delta Sxf(-)$ is set as, for example, the minimum value (for example, -1%) of the amount of change in the "-" direction in the light diffusion degree setting processing. The first fine adjustment button B1(-) is, for example, a button (pictorial image) displayed as an icon with which the horizontal diffusion degree fine adjustment amount $\Delta Sxf(-)$ to be added to the horizontal diffusion degree Sx can be selected by touching the first fine adjustment button B1(-) displayed on the display region DA.

In the example illustrated in FIGS. 21A and 21B, the first fine adjustment button B1(+) and the first fine adjustment button B1(-) are displayed, for example, in the X direction below an area in the XY plane where the light distribution shape object OBJ is displayed.

The fine adjustment amount (second-direction light diffusion degree fine adjustment amount) $\Delta Syf(+)$ by which the vertical diffusion degree Sy increases in the Dy direction (second direction) is defined for the second fine adjustment button B2(+). The fine adjustment amount $\Delta Syf(+)$ is set as, for example, the minimum value (for example, +1%) of the amount of change in the "+" direction in the light diffusion degree setting processing. The second fine adjustment button B2(+) is, for example, a button (pictorial image) displayed as an icon with which the fine adjustment amount $\Delta Syf(+)$ to be added to the vertical diffusion degree Sy can be selected by touching the second fine adjustment button B2(+) displayed on the display region DA.

The vertical diffusion degree fine adjustment amount (second-direction light diffusion degree fine adjustment amount) $\Delta Syf(-)$ by which the vertical diffusion degree Sy decreases in the Dy direction (second direction) is defined for the second fine adjustment button B2(-). The vertical diffusion degree fine adjustment amount $\Delta Syf(-)$ is set as, for example, the minimum value (for example, -1%) of the amount of change in the "-" direction in the light diffusion degree setting processing. The second fine adjustment button B2(-) is, for example, a button (pictorial image) displayed as an icon with which the vertical diffusion degree fine adjustment amount $\Delta Syf(-)$ to be added to the vertical diffusion degree Sy can be selected by touching the second fine adjustment button B2(-) displayed on the display region DA.

In the example illustrated in FIGS. 21A and 21B, the second fine adjustment button B2(+) and the second fine adjustment button B2(−) are displayed, for example, side by side in the Y direction on the right side of the area in the XY plane where the light distribution shape object OBJ is displayed.

The display positions of the first fine adjustment button B1 and the second fine adjustment button B2 on the light diffusion degree setting screen are not limited to the example illustrated in FIGS. 21A and 21B. The first fine adjustment button B1(+) and the first fine adjustment button B1(−) only need to be displayed such that they are arranged in the X direction on the light diffusion degree setting screen. The second fine adjustment button B2(+) and the second fine adjustment button B2(−) only need to be displayed such that they are arranged in the Y direction on the light diffusion degree setting screen.

The following describes the light diffusion degree fine adjustment processing by the control device 200a for the illumination device 1 according to the second embodiment described above, and the illumination device 1 of the illumination system.

Figure 22:
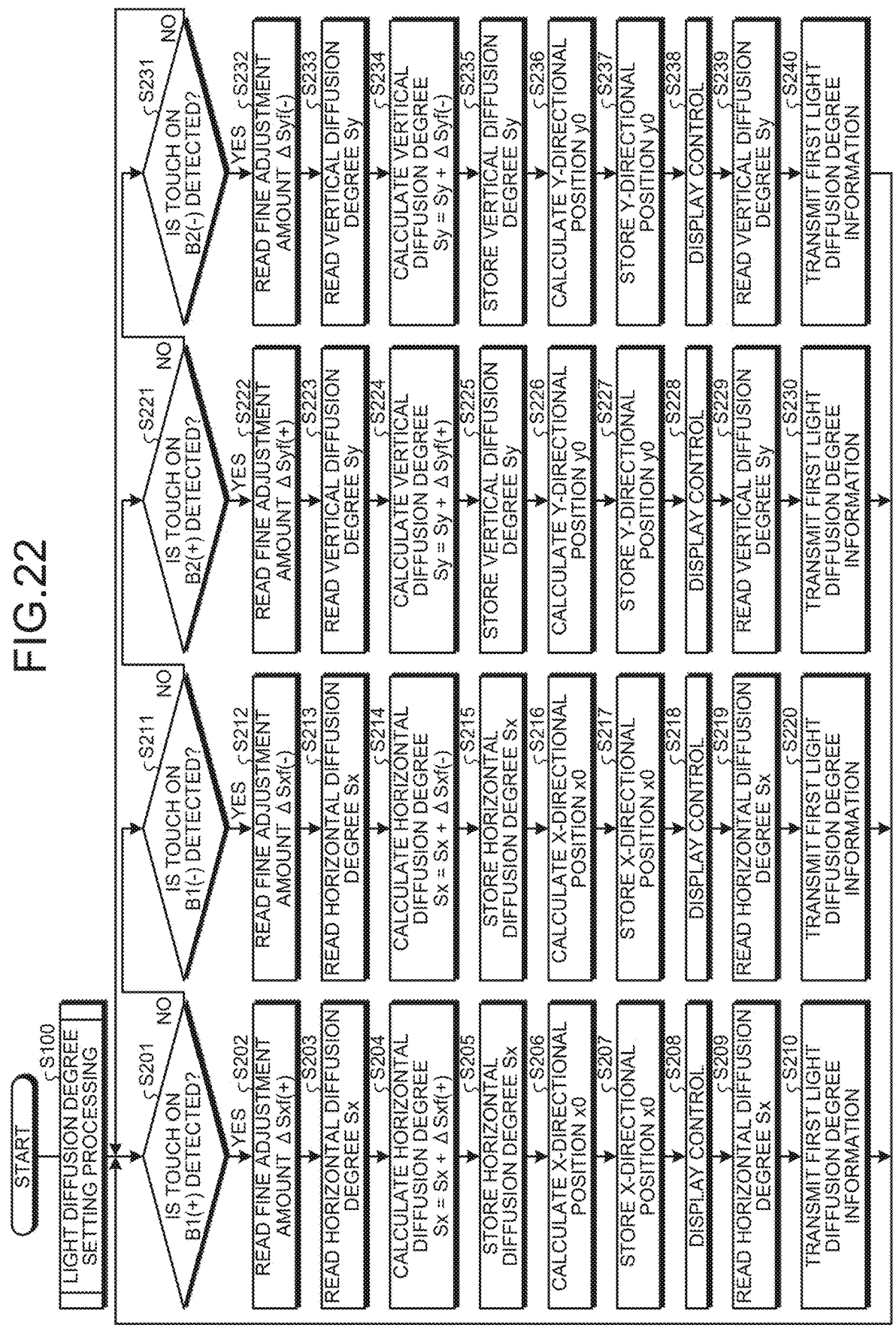
FIG. 22 is a flowchart illustrating an example of light diffusion degree fine adjustment processing by a control device for an illumination device according to the second embodiment.

FIG. 22 is a flowchart illustrating an example of the light diffusion degree fine adjustment processing by the control device 200a for the illumination device 1 according to the second embodiment.

In the second embodiment, an example is described in which the light diffusion degree fine adjustment processing illustrated in FIG. 22 is executed after the light diffusion degree setting processing illustrated in FIG. 18 or 19 is executed after transition to the waiting state for the light diffusion degree setting processing is made in initial setting of the light diffusion degree setting processing screen illustrated in FIG. 17. The light diffusion degree setting processing (step S100) illustrated in FIG. 22 corresponds to the light diffusion degree setting processing according to the first embodiment or the modification of the first embodiment (FIG. 18 or 19).

The following description assumes that the light diffusion degree fine adjustment processing is enabled (ON) in advance. Alternatively, the light diffusion degree fine adjustment processing may be switched from disabled (OFF) to enabled (ON) as the user touches the toggle switch TSW after execution of the light diffusion degree setting processing illustrated in FIG. 18 or 19.

In a waiting state for the light diffusion degree fine adjustment processing after the light diffusion degree setting processing (step S100), the control device 200a executes touch detection processing of the first fine adjustment button B1(+) (step S201), touch detection processing of the first fine adjustment button B1(−) (step S211), touch detection processing of the second fine adjustment button B2(+) (step S221), and touch detection processing of the second fine adjustment button B2(−) (step S231).

Specifically, when the first fine adjustment button B1(+) is touched (Yes at step S201), transition to step S202 is made. When the first fine adjustment button B1(+) is not touched (No at step S201), transition to step S211 is made.

When the first fine adjustment button B1(−) is touched (Yes at step S211), transition to step S212 is made. When the first fine adjustment button B1(−) is not touched (No at step S211), transition to step S221 is made.

When the second fine adjustment button B2(+) is touched (Yes at step S221), transition to step S222 is made. When the second fine adjustment button B2(+) is not touched (No at step S221), transition to step S231 is made.

When the second fine adjustment button B2(−) is touched (Yes at step S231), transition to step S232 is made. When the second fine adjustment button B2(−) is not touched (No at step S231), a return to step S201 is made.

If the first fine adjustment button B1(+) is touched (Yes at step S201), the light diffusion degree calculation circuit 222a reads the horizontal diffusion degree fine adjustment amount ΔSxf(+) defined for the first fine adjustment button B1(+) from the storage circuit 223a (step S202), reads the horizontal diffusion degree Sx before the above-described touch, which is stored in the storage circuit 223a (step S203), calculates the horizontal diffusion degree Sx after the above-described touch (=Sx+ΔSxf(+)) from the read information, and updates the horizontal diffusion degree (step S204). Then, the calculated horizontal diffusion degree Sx is stored in the storage circuit 223a (step S205).

The position calculation circuit 226 calculates and updates the X-directional position x0 of the first slider S1 on the display region DA after the above-described touch on the first fine adjustment button B1(+) by using Expression (3) above (step S206) and stores the updated X-directional position x0 in the storage circuit 223a (step S207).

Then, the display control circuit 231 reads, from the storage circuit 223a, the horizontal diffusion degree Sx and the X-directional position x0 updated through the above-described processing at steps S202 to S207 and executes display control of the display panel 20 such that the read information is reflected in the shape of the light distribution shape object OBJ, the position of the first slider S1, and the display of the horizontal diffusion degree Sx (step S208).

The transmission-reception circuit 225 reads the horizontal diffusion degree Sx stored in the storage circuit 223a (step S209), sets the read horizontal diffusion degree Sx as the Dx-direction light diffusion degree S1x, and transmits the first light diffusion degree information to the illumination device 1 (step S210).

The electrode drive circuit 112 of the illumination device 1 stores the first light diffusion degree information (Dx-direction light diffusion degree S1x) received from the control device 200a in the storage circuit 113 as the second light diffusion degree information and supplies drive voltage to the drive electrodes 10 and 13 of each liquid crystal cell 2 of the optical element 100 based on the second light diffusion degree information.

If the first fine adjustment button B1(−) is touched (Yes at step S211), the light diffusion degree calculation circuit 222a reads the horizontal diffusion degree fine adjustment amount ΔSxf(−) defined for the first fine adjustment button B1(−) from the storage circuit 223a (step S212), also reads the horizontal diffusion degree Sx stored in the storage circuit 223a (step S213), calculates the horizontal diffusion degree Sx (=Sx+ΔSxf(−)) (step S214), and stores the calculated horizontal diffusion degree Sx in the storage circuit 223a (step S215).

The position calculation circuit 226 calculates the X-directional position x0 of the first slider S1 on the display region DA by using Expression (3) above (step S216) and stores the calculated X-directional position x0 in the storage circuit 223a (step S217).

Then, the display control circuit 231 reads, from the storage circuit 223a, the horizontal diffusion degree Sx and the X-directional position x0 calculated through the above-described processing at steps S212 to S217 and executes display control of the display panel 20 such that the read information is reflected in the shape of the light distribution shape object OBJ, the position of the first slider S1, and the display of the horizontal diffusion degree Sx (step S218).

The transmission-reception circuit 225 reads the horizontal diffusion degree Sx stored in the storage circuit 223a (step S219), sets the read horizontal diffusion degree Sx as the Dx-direction light diffusion degree S1x, and transmits the first light diffusion degree information to the illumination device 1 (step S220).

The electrode drive circuit 112 of the illumination device 1 stores the first light diffusion degree information (Dx-direction light diffusion degree S1x) received from the control device 200a in the storage circuit 113 as the second light diffusion degree information and supplies drive voltage to the drive electrodes 10 and 13 of each liquid crystal cell 2 of the optical element 100 based on the second light diffusion degree information.

If the second fine adjustment button B2(+) is touched (Yes at step S221), the light diffusion degree calculation circuit 222a reads the vertical diffusion degree fine adjustment amount ΔSyf(+) defined for the second fine adjustment button B2(+) from the storage circuit 223a (step S222), also reads the vertical diffusion degree Sy stored in the storage circuit 223a (step S223), calculates the vertical diffusion degree Sy (=Sy+ΔSyf(+)) (step S224), and stores the calculated vertical diffusion degree Sy in the storage circuit 223a (step S225).

The position calculation circuit 226 calculates the Y-directional position y0 of the second slider S2 on the display region DA by using Expression (6) above (step S226) and stores the calculated Y-directional position y0 in the storage circuit 223a (step S227).

Then, the display control circuit 231 reads, from the storage circuit 223a, the vertical diffusion degree Sy and the Y-directional position y0 calculated by the above-described processing at steps S222 to S227 and executes display control of the display panel 20 such that the read information is reflected in the shape of the light distribution shape object OBJ, the position of the second slider S2, and the display of the vertical diffusion degree Sy (step S228).

The transmission-reception circuit 225 reads the vertical diffusion degree Sy stored in the storage circuit 223a (step S229), sets the read vertical diffusion degree Sy as the Dy-direction light diffusion degree S1y, and transmits the first light diffusion degree information to the illumination device 1 (step S230).

The electrode drive circuit 112 of the illumination device 1 stores the first light diffusion degree information (Dy-direction light diffusion degree S1y) received from the control device 200a in the storage circuit 113 as the second light diffusion degree information and supplies drive voltage to the drive electrodes 10 and 13 of each liquid crystal cell 2 of the optical element 100 based on the second light diffusion degree information.

If the second fine adjustment button B2(−) is touched (Yes at step S231), the light diffusion degree calculation circuit 222a reads the vertical diffusion degree fine adjustment amount ΔSyf(−) defined for the second fine adjustment button B2(−) from the storage circuit 223a (step S232), also reads the vertical diffusion degree Sy stored in the storage circuit 223a (step S233), calculates the vertical diffusion degree Sy (=Sy+ΔSyf(−)) (step S234), and stores the calculated vertical diffusion degree Sy in the storage circuit 223a (step S235).

The position calculation circuit 226 calculates the Y-directional position y0 of the second slider S2 on the display region DA by using Expression (6) above (step S236) and stores the calculated Y-directional position y0 in the storage circuit 223a (step S237).

Then, the display control circuit 231 reads, from the storage circuit 223a, the vertical diffusion degree Sy and the Y-directional position y0 calculated by the above-described processing at steps S232 to S237 and executes display control of the display panel 20 such that the read information is reflected in the shape of the light distribution shape object OBJ, the position of the second slider S2, and the display of the vertical diffusion degree Sy (step S238).

The transmission-reception circuit 225 reads the vertical diffusion degree Sy stored in the storage circuit 223a (step S239), sets the read vertical diffusion degree Sy as the Dy-direction light diffusion degree S1y, and transmits the first light diffusion degree information to the illumination device 1 (step S240).

The electrode drive circuit 112 of the illumination device 1 stores the first light diffusion degree information (Dy-direction light diffusion degree S1y) received from the control device 200a in the storage circuit 113 as the second light diffusion degree information and supplies drive voltage to the drive electrodes 10 and 13 of each liquid crystal cell 2 of the optical element 100 based on the second light diffusion degree information.

Through the above-described light diffusion degree fine adjustment processing according to the second embodiment, the horizontal diffusion degree Sx and the vertical diffusion degree Sy can be finely adjusted for the setting result of the light diffusion degree by the light diffusion degree setting processing illustrated in FIG. 18 or 19. This enables fine adjustment of the light diffusion degree, which is difficult with movement (drag operation) of the first slider S1 or the second slider S2 on the light diffusion degree setting screen.

The above description of the second embodiment is exemplarily made on the aspect in which the horizontal diffusion degree fine adjustment amount ΔSxf(+) and the vertical diffusion degree fine adjustment amount ΔSyf(+) are set as the minimum value (for example, +1%) of the amount of change in the "+" direction in the light diffusion degree setting processing, and the horizontal diffusion degree fine adjustment amount ΔSxf(−) and the vertical diffusion degree fine adjustment amount ΔSyf(−) are set as the minimum value (for example, −1%) of the amount of change in the "−" direction in the light diffusion degree setting processing. In other words, for example, each time the first fine adjustment button B1(+) is pressed once, the first slider S1 on the display screen moves to right by 1% and the light distribution state of the illumination device 1 spreads in the horizontal direction by 1%. Thus, the first fine adjustment button B1(+) is to be pressed three times for fine adjustment by +3% in the x direction. Not only adjustment of few percent but also adjustment of ten to several tens of percent can be made by pressing the fine adjustment button multiple times.

The values of the horizontal diffusion degree fine adjustment amount ΔSxf(+), the vertical diffusion degree fine adjustment amount ΔSyf(+), the horizontal diffusion degree fine adjustment amount ΔSxf(−), and the vertical diffusion degree fine adjustment amount ΔSyf(−) are not limited to ±1%.

Specifically, the horizontal diffusion degree fine adjustment amount ΔSxf(+) and the vertical diffusion degree fine adjustment amount ΔSyf(+) may be, for example, a value (for example, +0.1%) smaller than the minimum value of the amount of change in the "+" direction in the light diffusion degree setting processing, and the horizontal diffusion degree fine adjustment amount ΔSxf(−) and the vertical diffusion degree fine adjustment amount ΔSyf(−) may be, for example, a value (for example, −0.1%) smaller than the minimum value of the amount of change in the "−" direction in the light diffusion degree setting processing.

In this case, display of the shape of the light distribution shape object OBJ and the position of the first slider S1 (or the second slider S2) may be reflected onto the light diffusion degree setting screen when the accumulate value of the horizontal diffusion degree fine adjustment amount ΔSxf(+) (or the vertical diffusion degree fine adjustment amount ΔSyf(+)) becomes equal to the minimum value (for example, +1%) of the amount of change in the "+" direction in the light diffusion degree setting processing.

Display of the shape of the light distribution shape object OBJ and the position of the first slider S1 (or the second slider S2) may be reflected onto the light diffusion degree setting screen when the accumulate value of the horizontal diffusion degree fine adjustment amount ΔSxf(−) (or the vertical diffusion degree fine adjustment amount ΔSyf(−)) becomes equal to the minimum value (for example, −1%) of the amount of change in the "−" direction in the light diffusion degree setting processing.

The preferable embodiments of the present disclosure are described above, but the present disclosure is not limited to the embodiments. Contents disclosed in the embodiments are merely exemplary and may be modified in various kinds of manners without departing from the scope of the present disclosure. Appropriate modifications made without departing from the scope of the present disclosure naturally belong to the technical scope of the present disclosure.

What is claimed is:

1. A control device for an illumination device capable of controlling a light distribution state of light emitted from a light source in two directions of a first direction and a second direction intersecting the first direction, the control device comprising:
    a touch sensor having a detection region provided with a plurality of detection elements; and
    a display panel provided with a display region overlapping the detection region of the touch sensor in a plan view, wherein
    a light diffusion degree setting screen for executing light diffusion degree setting processing for the illumination device is displayed on the display region of the display panel, and
    an X direction corresponding to the first direction, a Y direction corresponding to the second direction, and an XY plane with an origin at a predetermined position on the light diffusion degree setting screen are defined for the light diffusion degree setting screen, and
    the light diffusion degree setting screen is provided with
        a light distribution shape object with a central point at the origin of the XY plane,
        a first light diffusion degree setting object with a central point at an intersection point of an X axis of the XY plane and an outline of the light distribution shape object, and
        a second light diffusion degree setting object with a central point at an intersection point of a Y axis of the XY plane and the outline of the light distribution shape object.

2. The control device for the illumination device according to claim 1, wherein
    in the light diffusion degree setting screen,
    when a touch state on the first light diffusion degree setting object is maintained, a width of the light distribution shape object in an X-axis direction changes in response to movement of the first light diffusion degree setting object in the X direction, and
    when a touch state on the second light diffusion degree setting object is maintained, a width of the light distribution shape object in a Y-axis direction changes in response to movement of the second light diffusion degree setting object in the Y direction.

3. The control device for the illumination device according to claim 2, wherein a light diffusion degree set in the light diffusion degree setting processing is transmitted to the illumination device as light diffusion degree information.

4. The control device for the illumination device according to claim 3, wherein
    when the touch state on the first light diffusion degree setting object is released, light diffusion degree information corresponding to a position of the first light diffusion degree setting object in the X direction is transmitted to the illumination device, and
    when the touch state on the second light diffusion degree setting object is released, light diffusion degree information corresponding to a position of the second light diffusion degree setting object in the Y direction is transmitted to the illumination device.

5. The control device for the illumination device according to claim 3, wherein
    when the touch state on the first light diffusion degree setting object is maintained, light diffusion degree information is transmitted to the illumination device in response to movement of the first light diffusion degree setting object in the X direction, and
    when the touch state on the second light diffusion degree setting object is maintained, light diffusion degree information is transmitted to the illumination device in response to movement of the second light diffusion degree setting object in the Y direction.

6. The control device for the illumination device according to claim 1, wherein
    the light diffusion degree setting screen is provided with
        a fine adjustment switching object for selecting whether light diffusion degree fine adjustment processing of the illumination device is enabled or disabled,
        a first fine adjustment object for finely adjusting a light diffusion degree of the illumination device in the first direction, and
        a second fine adjustment object for finely adjusting a light diffusion degree of the illumination device in the second direction, and
    the first fine adjustment object and the second fine adjustment object are displayed when the light diffusion degree fine adjustment processing is enabled, and are hidden when the light diffusion degree fine adjustment processing is disabled.

7. The control device for the illumination device according to claim 6, wherein
    a first-direction light diffusion degree fine adjustment amount of the illumination device is defined for the first fine adjustment object,
    a second-direction light diffusion degree fine adjustment amount of the illumination device is defined for the second fine adjustment object,
    when a touch on the first fine adjustment object is detected, light diffusion degree information obtained by adding the first-direction light diffusion degree fine adjustment amount to the light diffusion degree in the first direction is transmitted to the illumination device, and
    when a touch on the second fine adjustment object is detected, light diffusion degree information obtained by adding the second-direction light diffusion degree fine adjustment amount to the light diffusion degree in the second direction is transmitted to the illumination device.

8. The control device for the illumination device according to claim 7, wherein
the first-direction light diffusion degree fine adjustment amount is set as a minimum value of an amount of change in the light diffusion degree in the first direction in the light diffusion degree setting processing, and
the second-direction light diffusion degree fine adjustment amount is set as a minimum value of an amount of change in the light diffusion degree in the second direction in the light diffusion degree setting processing.

9. The control device for the illumination device according to claim 7, wherein
the first-direction light diffusion degree fine adjustment amount is set as a value smaller than a minimum value of an amount of change in the light diffusion degree in the first direction in the light diffusion degree setting processing, and
the second-direction light diffusion degree fine adjustment amount is set as a value smaller than a minimum value of an amount of change in the light diffusion degree in the second direction in the light diffusion degree setting processing.

10. The control device for the illumination device according to claim 7, wherein
the first fine adjustment object includes
a positive-side first fine adjustment object for which a first-direction light diffusion degree fine adjustment amount that increases in the first direction is defined, and
a negative-side first fine adjustment object for which a first-direction light diffusion degree fine adjustment amount that decreases in the first direction is defined, and
the second fine adjustment object includes
a positive-side second fine adjustment object for which a second-direction light diffusion degree fine adjustment amount that increases in the second direction is defined, and
a negative-side second fine adjustment object for which a second-direction light diffusion degree fine adjustment amount that decreases in the second direction is defined.

11. The control device for the illumination device according to claim 10, wherein on the light diffusion degree setting screen,
the positive-side first fine adjustment object and the negative-side first fine adjustment object are arranged in the first direction, and
the positive-side second fine adjustment object and the negative-side second fine adjustment object are arranged in the second direction.

12. An illumination system comprising:
an illumination device including a light source and an optical element provided on an optical axis of the light source and capable of controlling a light distribution state of light emitted from the light source in two directions of a first direction and a second direction intersecting the first direction; and
a control device configured to control the illumination device to change the light distribution state, wherein
the control device includes
a touch sensor having a detection region provided with a plurality of detection elements, and
a display panel provided with a display region overlapping the detection region of the touch sensor in a plan view,
a light diffusion degree setting screen for executing light diffusion degree setting processing for the illumination device is displayed on the display region of the display panel, and
an X direction corresponding to the first direction, a Y direction corresponding to the second direction, and an XY plane with an origin at a predetermined position on the light diffusion degree setting screen are defined for the light diffusion degree setting screen, and
the light diffusion degree setting screen is provided with
a light distribution shape object with a central point at the origin of the XY plane,
a first light diffusion degree setting object with a central point at an intersection point of an X axis of the XY plane and an outline of the light distribution shape object, and
a second light diffusion degree setting object with a central point at an intersection point of a Y axis of the XY plane and the outline of the light distribution shape object.

13. The illumination system according to claim 12, wherein
in the light diffusion degree setting screen,
when a touch state on the first light diffusion degree setting object is maintained, a width of the light distribution shape object in an X-axis direction changes in response to movement of the first light diffusion degree setting object in the X direction, and
when a touch state on the second light diffusion degree setting object is maintained, a width of the light distribution shape object in a Y-axis direction changes in response to movement of the second light diffusion degree setting object in the Y direction.

14. The illumination system according to claim 13, wherein
the control device transmits a light diffusion degree set in the light diffusion degree setting processing to the illumination device as first light diffusion degree information, and
upon startup, the illumination device transmits a final value of the light diffusion degree during previous energization to the control device as second light diffusion degree information.

15. The illumination system according to claim 14, wherein
when the touch state on the first light diffusion degree setting object is released, the control device transmits first light diffusion degree information corresponding to a position of the first light diffusion degree setting object in the X direction to the illumination device, and
when the touch state on the second light diffusion degree setting object is released, the control device transmits first light diffusion degree information corresponding to a position of the second light diffusion degree setting object in the Y direction to the illumination device.

16. The illumination system according to claim 14, wherein
when the touch state on the first light diffusion degree setting object is maintained, the control device transmits first light diffusion degree information to the illumination device in response to movement of the first light diffusion degree setting object in the X direction, and when the touch state on the second light diffusion degree setting object is maintained, the control device transmits first light diffusion degree information to the illumination device in response to movement of the second light diffusion degree setting object in the Y direction.

17. The illumination system according to claim 12, wherein
the light diffusion degree setting screen is provided with
a fine adjustment switching object for selecting whether light diffusion degree fine adjustment processing of the illumination device is enabled or disabled,
a first fine adjustment object for finely adjusting a light diffusion degree of the illumination device in the first direction, and
a second fine adjustment object for finely adjusting a light diffusion degree of the illumination device in the second direction, and
the first fine adjustment object and the second fine adjustment object are displayed when the light diffusion degree fine adjustment processing is enabled, and are hidden when the light diffusion degree fine adjustment processing is disabled.

18. The illumination system according to claim 17, wherein
a first-direction light diffusion degree fine adjustment amount of the illumination device is defined for the first fine adjustment object,
a second-direction light diffusion degree fine adjustment amount of the illumination device is defined for the second fine adjustment object,
when a touch on the first fine adjustment object is detected, the control device transmits first light diffusion degree information obtained by adding the first-direction light diffusion degree fine adjustment amount to the light diffusion degree in the first direction to the illumination device, and
when a touch on the second fine adjustment object is detected, the control device transmits first light diffusion degree information obtained by adding the second-direction light diffusion degree fine adjustment amount to the light diffusion degree in the second direction to the illumination device.

19. The illumination system according to claim 18, wherein
the first-direction light diffusion degree fine adjustment amount is set as a minimum value of an amount of change in the light diffusion degree in the first direction in the light diffusion degree setting processing, and
the second-direction light diffusion degree fine adjustment amount is set as a minimum value of an amount of change in the light diffusion degree in the second direction in the light diffusion degree setting processing.

20. The illumination system according to claim 18, wherein
the first-direction light diffusion degree fine adjustment amount is set as a value smaller than a minimum value of an amount of change in the light diffusion degree in the first direction in the light diffusion degree setting processing, and
the second-direction light diffusion degree fine adjustment amount is set as a value smaller than a minimum value of an amount of change in the light diffusion degree in the second direction in the light diffusion degree setting processing.

21. The illumination system according to claim 18, wherein
the first fine adjustment object includes
a positive-side first fine adjustment object for which a first-direction light diffusion degree fine adjustment amount that increases in the first direction is defined, and
a negative-side first fine adjustment object for which a first-direction light diffusion degree fine adjustment amount that decreases in the first direction is defined, and
the second fine adjustment object includes
a positive-side second fine adjustment object for which a second-direction light diffusion degree fine adjustment amount that increases in the second direction is defined, and
a negative-side second fine adjustment object for which a second-direction light diffusion degree fine adjustment amount that decreases in the second direction is defined.

22. The illumination system according to claim 21, wherein on the light diffusion degree setting screen,
the positive-side first fine adjustment object and the negative-side first fine adjustment object are arranged in the first direction, and
the positive-side second fine adjustment object and the negative-side second fine adjustment object are arranged in the second direction.

\* \* \* \* \*